(12) United States Patent
Imai et al.

(10) Patent No.: US 11,082,594 B2
(45) Date of Patent: Aug. 3, 2021

(54) IMAGING DEVICE AND ELECTRONIC DEVICE

(71) Applicant: Nidec Copal Corporation, Tokyo (JP)

(72) Inventors: Kenzo Imai, Tokyo (JP); Nobuaki Watanabe, Tokyo (JP); Daisuke Kakemizu, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/699,433

(22) Filed: Nov. 29, 2019

(65) Prior Publication Data

US 2020/0177777 A1 Jun. 4, 2020

(30) Foreign Application Priority Data

Nov. 30, 2018 (JP) .............................. JP2018-224360

(51) Int. Cl.
| | | |
|---|---|---|
| *H04N 5/225* | (2006.01) | |
| *H04N 5/232* | (2006.01) | |
| *G08B 5/36* | (2006.01) | |
| *G03B 11/04* | (2021.01) | |
| *G08B 21/18* | (2006.01) | |
| *G06F 21/31* | (2013.01) | |
| *G08B 3/10* | (2006.01) | |

(52) U.S. Cl.
CPC ......... *H04N 5/2254* (2013.01); *G03B 11/043* (2013.01); *G06F 21/31* (2013.01); *G08B 3/10* (2013.01); *G08B 5/36* (2013.01); *G08B 21/18* (2013.01); *H04N 5/23245* (2013.01); *H04N 5/2251* (2013.01)

(58) Field of Classification Search
None
See application file for complete search history.

(56) References Cited

U.S. PATENT DOCUMENTS

| | | | |
|---|---|---|---|
| 6,464,411 | B1 | 10/2002 | Yoshida et al. |
| 8,902,318 | B1 * | 12/2014 | Haddad ................ H04N 5/2254 |
| | | | 348/207.99 |
| 2005/0068423 | A1 * | 3/2005 | Bear .................. H04N 5/23203 |
| | | | 348/207.99 |

(Continued)

FOREIGN PATENT DOCUMENTS

| | | |
|---|---|---|
| JP | 2000-111989 A | 4/2000 |
| JP | 2001-91993 A | 4/2001 |

(Continued)

*Primary Examiner* — Twyler L Haskins
*Assistant Examiner* — Wesley J Chiu
(74) *Attorney, Agent, or Firm* — Hauptman Ham, LLP

(57) ABSTRACT

An imaging device used in, for example, a smartphone controls a blade to avoid remaining open after unauthorized external access or a drop impact. The imaging device includes an image sensor, a blade operable to switch between a closed state in which the blade at least partially blocks light incident on the image sensor and an open state in which light is incident on the image sensor, a blade driver that drives the blade, and a blade controller that controls the blade driver. The blade controller determines whether the blade is in the closed state in a non-imaging mode in which imaging is off, and when determining that the blade is in the open state, the blade controller controls the blade driver to close the blade.

15 Claims, 31 Drawing Sheets

(56) References Cited

U.S. PATENT DOCUMENTS

| | | | | |
|---|---|---|---|---|
| 2005/0094027 A1* | 5/2005 | Kano | ................. | G06K 13/0825 |
| | | | | 348/362 |
| 2007/0269202 A1* | 11/2007 | Forsyth-Martinez | ....................... | |
| | | | | G03B 17/00 |
| | | | | 396/429 |
| 2013/0222609 A1* | 8/2013 | Soffer | .................... | G06F 21/83 |
| | | | | 348/207.1 |
| 2014/0274214 A1* | 9/2014 | Kim | ....................... | G06F 3/048 |
| | | | | 455/566 |
| 2014/0333831 A1* | 11/2014 | Oh | ....................... | G06F 1/1686 |
| | | | | 348/376 |
| 2016/0021286 A1* | 1/2016 | Shintani | ................. | H04N 5/361 |
| | | | | 348/370 |
| 2016/0241748 A1* | 8/2016 | Chang | ................ | G01N 15/1434 |
| 2018/0059510 A1* | 3/2018 | Gustaveson, II | ....... | G03B 11/04 |
| 2019/0199903 A1* | 6/2019 | Imai | ......................... | G03B 9/42 |
| 2019/0215426 A1* | 7/2019 | Ko | ........................ | G06F 1/1616 |
| 2019/0349512 A1* | 11/2019 | Bentley | ................. | G03B 11/04 |
| 2019/0369462 A1* | 12/2019 | Krause | ................. | G03B 11/045 |
| 2020/0174340 A1* | 6/2020 | Imai | ......................... | G03B 9/26 |
| 2020/0201143 A1* | 6/2020 | Imai | ......................... | G03B 9/36 |
| 2020/0228688 A1* | 7/2020 | Horiuchi | .............. | G03B 11/043 |
| 2020/0267341 A1* | 8/2020 | Baba | ...................... | H04L 9/3278 |
| 2020/0374432 A1* | 11/2020 | Cho | ....................... | G03B 11/04 |

FOREIGN PATENT DOCUMENTS

| | | |
|---|---|---|
| JP | 2001-356387 A | 12/2001 |
| JP | 2007-271989 A | 10/2007 |
| JP | 3170619 U | 9/2011 |
| JP | 2014-167559 A | 9/2014 |

\* cited by examiner

IMAGING DEVICE AND ELECTRONIC DEVICE

RELATED APPLICATIONS

The present application claims priority to Japanese Patent Application Number 2018-224360, filed Nov. 30, 2018, the disclosure of which is hereby incorporated by reference herein in its entirety.

BACKGROUND

Technical Field

An aspect of the present invention relates to an imaging device such as a camera.

Description of the Background

Many devices such as smartphones, tablets, and laptop personal computers (PCs) nowadays incorporate an imaging device (camera). Imaging devices incorporated in such devices are described in, for example, Patent Literatures 1 and 2.

CITATION LIST

Patent Literature

Patent Literature 1: Japanese Unexamined Patent Application Publication No. 2007-271989
Patent Literature 2: Japanese Unexamined Patent Application Publication No. 2001-356387

BRIEF SUMMARY

Imaging devices incorporated in such electronic devices may capture images at times unintended by the user, possibly causing privacy invasion and leakage of confidential information. Techniques are to be developed to avoid capturing images at times unintended by the user. One such technique uses a blade driving device to be installed on an optical path of an imaging device. However, known blade driving devices installed for imaging and for protecting the lens of the imaging device are typically designed to operate quietly. With a blade driving device installed to prevent unintended imaging as described above, the blade operates quietly and may be open without being easily noticeable by the user. Thus, the blade may be opened by unauthorized external access or a drop impact without being noticed by the user and may remain open.

In response to above issue, one or more aspects of the present invention are directed to the structures described below. The reference numerals or other labels in parentheses herein denote the corresponding components in the figures to facilitate understanding of the aspects of the present invention. However, the components with such reference numerals do not limit the components according to the aspects of the present invention, which should be construed broadly within the scope technically understandable by those skilled in the art.

An imaging device according to a first aspect of the present invention includes an image sensor (111), a blade (80) operable to switch between a closed state in which the blade at least partially blocks light incident on the image sensor and an open state in which light is incident on the image sensor, a blade driver (106) that drives the blade, and a blade controller (105) that controls the blade driver. The blade controller determines whether the blade is in the closed state in a non-imaging mode in which imaging is off, and when determining that the blade is in the open state, the blade controller controls the blade driver to close the blade.

The imaging device according to the above aspect can automatically restore the blade to the closed state when the blade is opened in the non-imaging mode as unintended by the user and imaging is enabled. When, for example, the imaging device is connectable to an external device through, for example, a network, the blade supposedly in the closed state can be opened by unauthorized external access. The above structure can restore the closed state. For a portable imaging device, the blade can be restored to the closed state when opened by, for example, a drop impact. This prevents image capturing unintended by the user and also prevents invasion of privacy.

In the above imaging device, the blade controller (105) may determine whether the blade is in the closed state at every predetermined time in the non-imaging mode, and when determining that the blade is in the open state, the blade controller (105) controls the blade driver to close the blade.

The imaging device with the above structure can restore the blade in the open state to the closed state after the predetermined time elapses. This effectively prevents the blade from remaining open unintentionally.

In the above imaging device, the blade controller may control the blade driver to retain the blade in the closed state in the non-imaging mode.

The imaging device with the above structure allows the blade to remain closed under an external force for opening the blade applied in the non-imaging mode. For example, the blade may remain closed under an external force generated by a drop impact greater than the driving force of the blade driver. This effectively prevents the blade from opening as unintended by the user.

In the above imaging device, the blade controller may determine whether the blade is in the open state in an imaging mode in which imaging is on, and when determining that the blade is in the closed state, the blade controller may control the blade driver to open the blade.

The imaging device with the above structure can automatically open the blade 80 and imaging is enabled when the blade is closed in the imaging mode as unintended by the user and imaging is disabled. Thus, the structure can restore the blade 80 to the open state when the blade 80 supposedly in the open state is closed by, for example, a drop impact or unauthorized access.

In the above imaging device, the non-imaging mode may include a locked state in which authentication has not been performed successfully by an authentication unit for authenticating a user.

The imaging device with the above structure can automatically restore the blade to the closed state when the blade is opened in the locked state as unintended by the user and imaging is enabled.

In the above imaging device, the blade controller may determine whether the blade is in the open state in an unlocked state in which authentication has been successfully performed by the authentication unit, and when determining that the blade is in the closed state, the blade controller may control the blade driver to open the blade.

The imaging device with the above structure can automatically open the blade and imaging is enabled when the blade is closed in the unlocked state as unintended by the user and imaging is disabled. This restores the blade to the open state when the blade supposedly in the open state is closed by, for example, a drop impact or unauthorized access.

In the above imaging device, the blade controller may determine whether the blade is in the open state or in the closed state based on a result of detection performed by the image sensor.

The imaging device with the above structure allows determination as to whether the blade is in the open state or in the closed state without any extra member for determining the open or closed state of the blade. Thus, processes may be performed in accordance with the open or closed state of the blade without additional components for any new structure or additional cost and complicated processing.

The above imaging device may further include a position detector (20c, 20d, 31, 35a, 35b) that detects a position of the blade. The blade controller may determine whether the blade is in the open state or in the closed state based on a result of detection performed by the position detector.

The imaging device with the above structure allows appropriate determination as to whether the blade is in the open state or in the closed state in dark surroundings.

The above imaging device may further include a notification unit that provides a notification indicating one of the open state and the closed state of the blade.

The imaging device with the above structure allows the user to notice the state of the blade, and thus prevents the blade from entering the open state or the closed state as unintended by the user.

In the above imaging device, the notification unit may include a sound output unit that outputs a sound when the blade enters the open state.

The imaging device with the above structure allows the user to notice the open state of the blade by hearing sound in, for example, dark surroundings. The structure thus allows the user to notice the state of the blade more reliably.

In the above imaging device, the notification unit may include a light emitter that changes light emission when the blade enters the open state.

The imaging device with the above structure allows the user to notice the open state of the blade visually in, for example, noisy or dark surroundings. The structure thus allows the user to notice the state of the blade more reliably.

In the above imaging device, the notification unit may include a color change unit that allows visual recognition of a color change from outside when the blade enters the open state.

The imaging device with the above simple structure allows the user to notice the open state of the blade visually. The structure thus allows the user to notice the state of the blade more reliably.

The above imaging device may further include a base (10) supporting the blade in a movable manner and having an opening, and an urging member (60) that urges the blade in the open state in a direction different from a direction in which the blade is urged in the closed state. The opening is located between the blade and the image sensor in the closed state.

The imaging device with the above structure maintains the open or closed state of the blade, and thus prevents the blade to be open or closed unexpectedly under an external force.

In the above imaging device, the blade may be movable by a manual operation in addition to being movable by the blade driver.

The imaging device with the above structure allows the blade to be moved manually when the blade cannot be closed after, for example, unauthorized access. This can increase security.

In the above imaging device, the blade may include an operation unit (80c) that is operable.

The imaging device with the above structure allows the blade to be easily operable manually.

An electronic device according to another aspect of the present invention at least includes a smartphone, a tablet, and a personal computer (PC) incorporating any one of the above imaging devices.

The electronic device susceptible to privacy invasion and leakage of confidential information caused by unauthorized access may have the above structure to effectively increase security.

DETAILED DESCRIPTION

Figure 1:
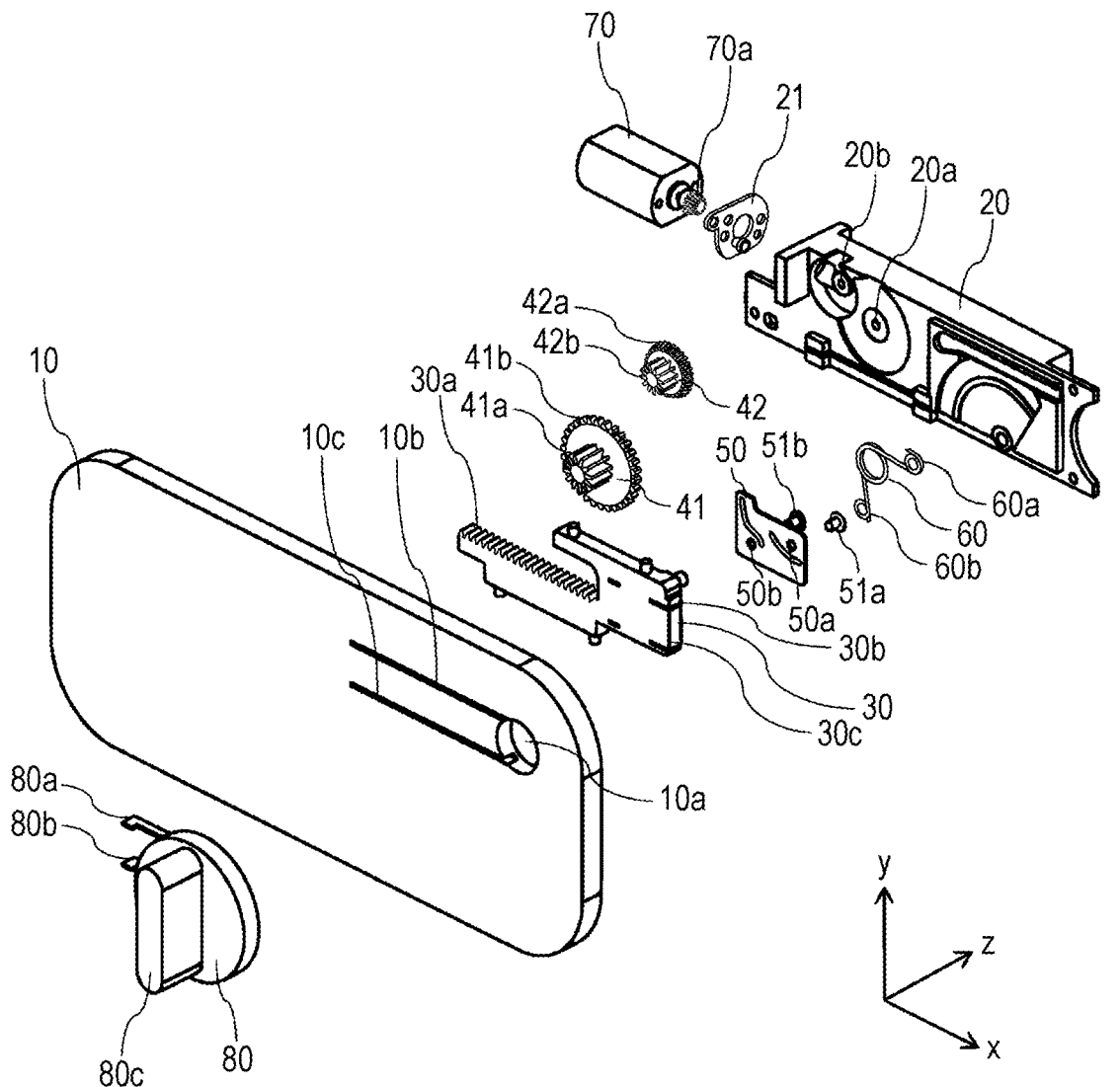
FIG. 1 is an exploded perspective view of a movable blade mechanism included in an imaging device according to a first embodiment.

An imaging device according to one or more embodiments of the present invention controls a blade for blocking light incident on an image sensor to avoid entering an open state as unintended by the user.

The structures according to embodiments of the present invention will now be described in detail below with reference to the drawings. The embodiments described below are merely examples of the present invention, and should not be construed as limiting the technical scope of the invention. In the figures, the same components are given the same reference numerals, and may not be described.

1. First Embodiment (1) Structure of Movable Blade Mechanism in Imaging Device in First Embodiment
(2) Functional Structure of Imaging Device in First Embodiment
(3) Operation of Imaging Device in First Embodiment
(4) First Modification
(5) Second Modification
(6) Third Modification
(7) Fourth Modification
(8) Fifth Modification
2. Second Embodiment
(1) Functional Structure of Imaging Device in Second Embodiment
(2) Operation of Imaging Device in Second Embodiment
(3) First Modification
(4) Second Modification
(5) Third Modification
3. Features
4. Supplemental Examples 1. First Embodiment (1) Structure of Movable Blade Mechanism in Imaging Device in First Embodiment A first embodiment of the present invention will now be described specifically with reference to FIGS. 1 to 23. The structure of a movable blade mechanism in an imaging device, the functional structure of the imaging device, and the operation of the imaging device will be described in the stated order.

The figures may include x-axis, y-axis, and z-axis that are orthogonal to one another. The arrow directions for x-axis, y-axis, and z-axis in the figures may be referred to as positive directions, and the directions opposite to the arrow directions may be referred to as negative directions. The negative z-direction, in which a subject is to be positioned facing an image sensor, may be referred to as a subject end. The positive z-direction, in which the image sensor is to be positioned facing a subject, may be referred to as an image sensor end.

Figure 2:
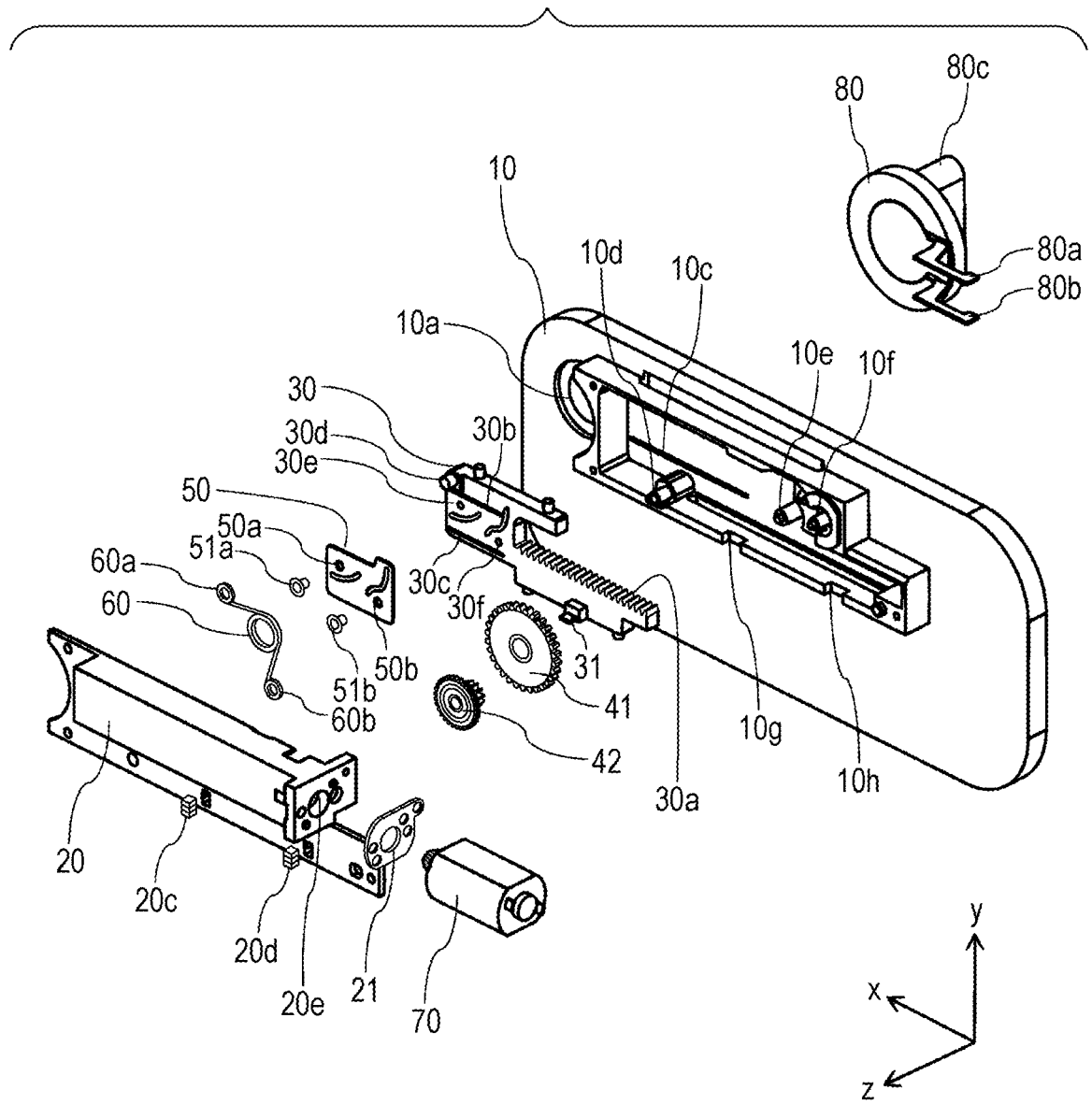
FIG. 2 is an exploded perspective view of the movable blade mechanism included in the imaging device according to the first embodiment.
Figure 3:
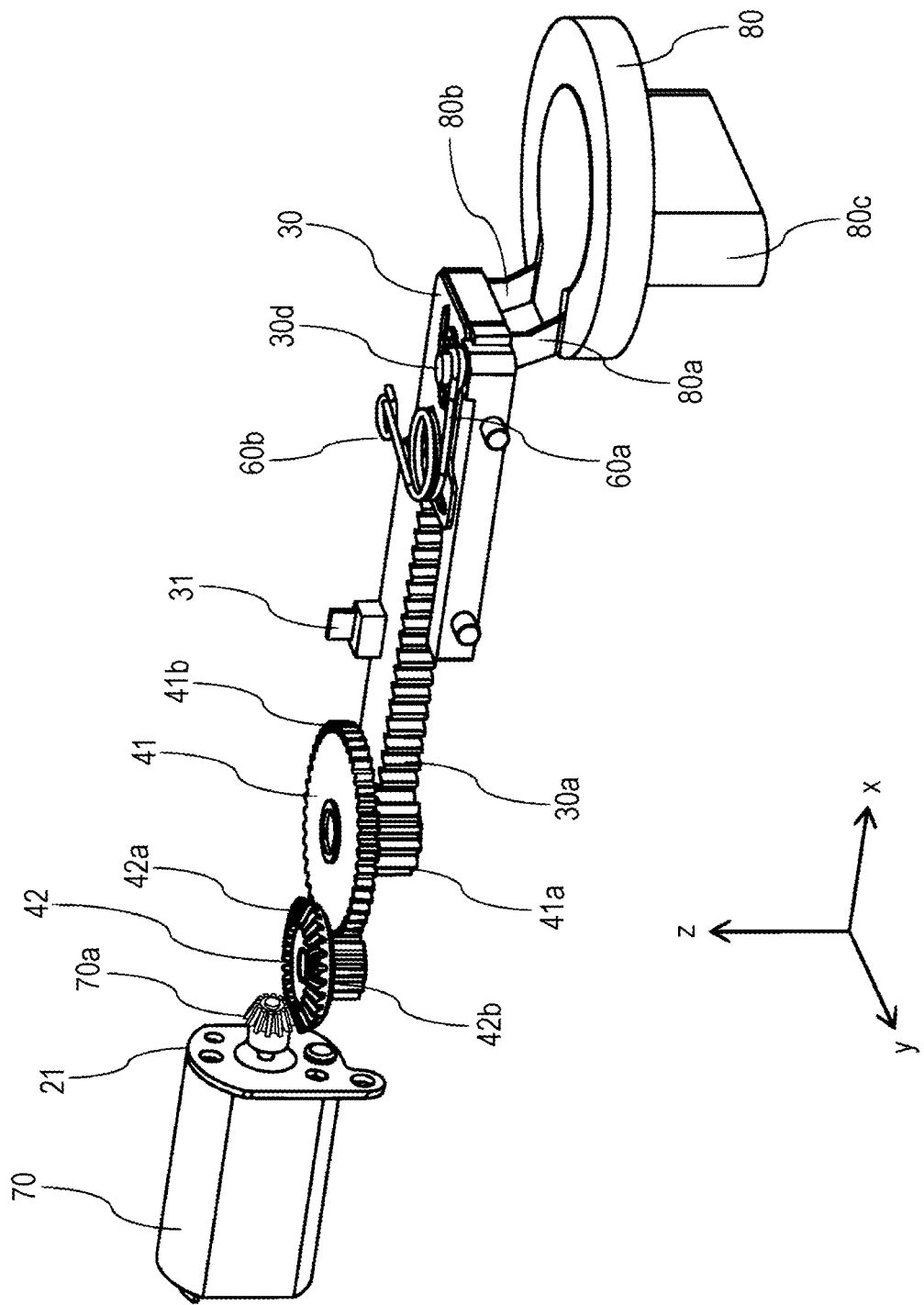
FIG. 3 is a perspective view of a drive mechanism included in the imaging device according to the first embodiment.
Figure 4:
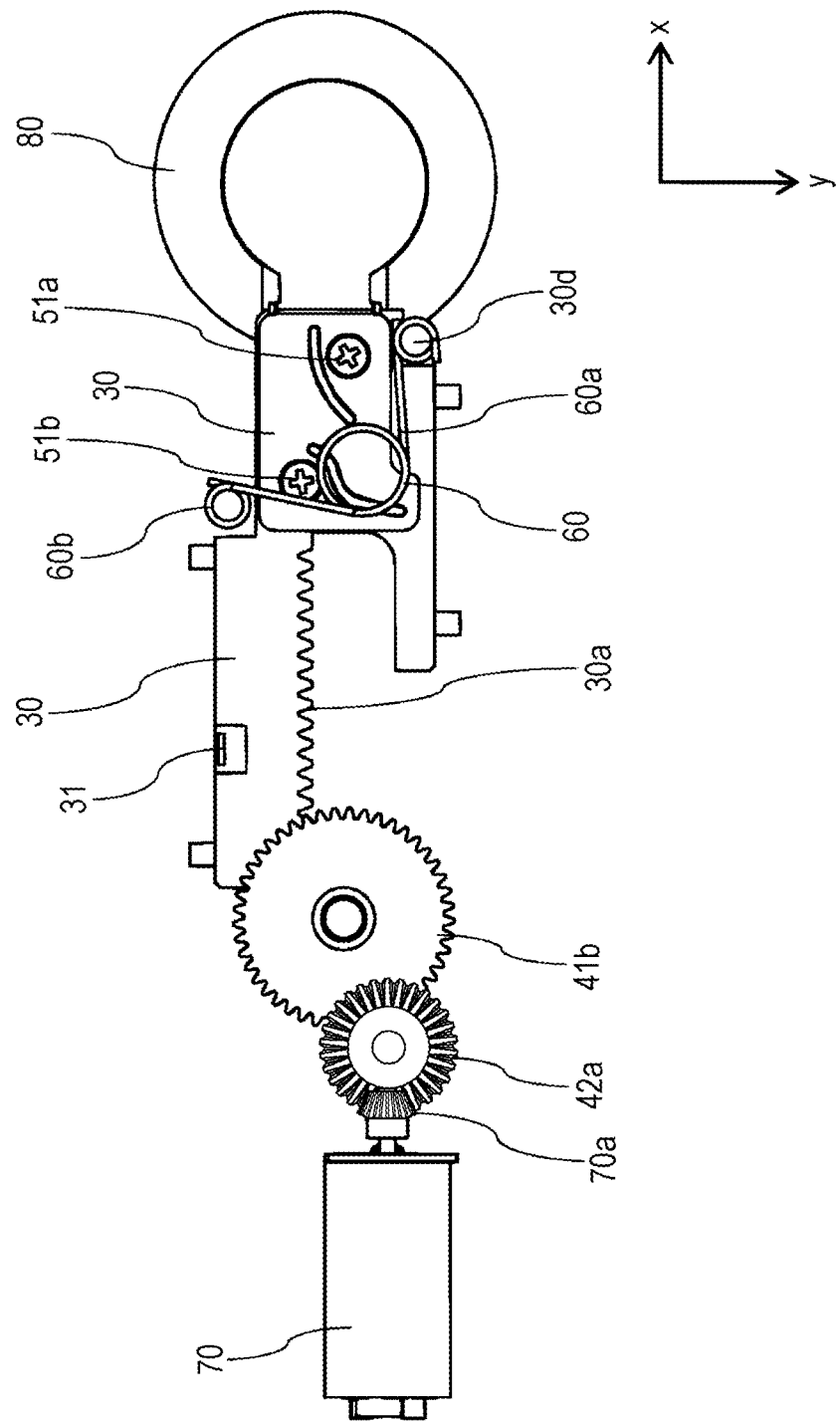
FIG. 4 is a plan view of the drive mechanism included in the imaging device according to the first embodiment viewed from the positive z-direction.
Figure 5:
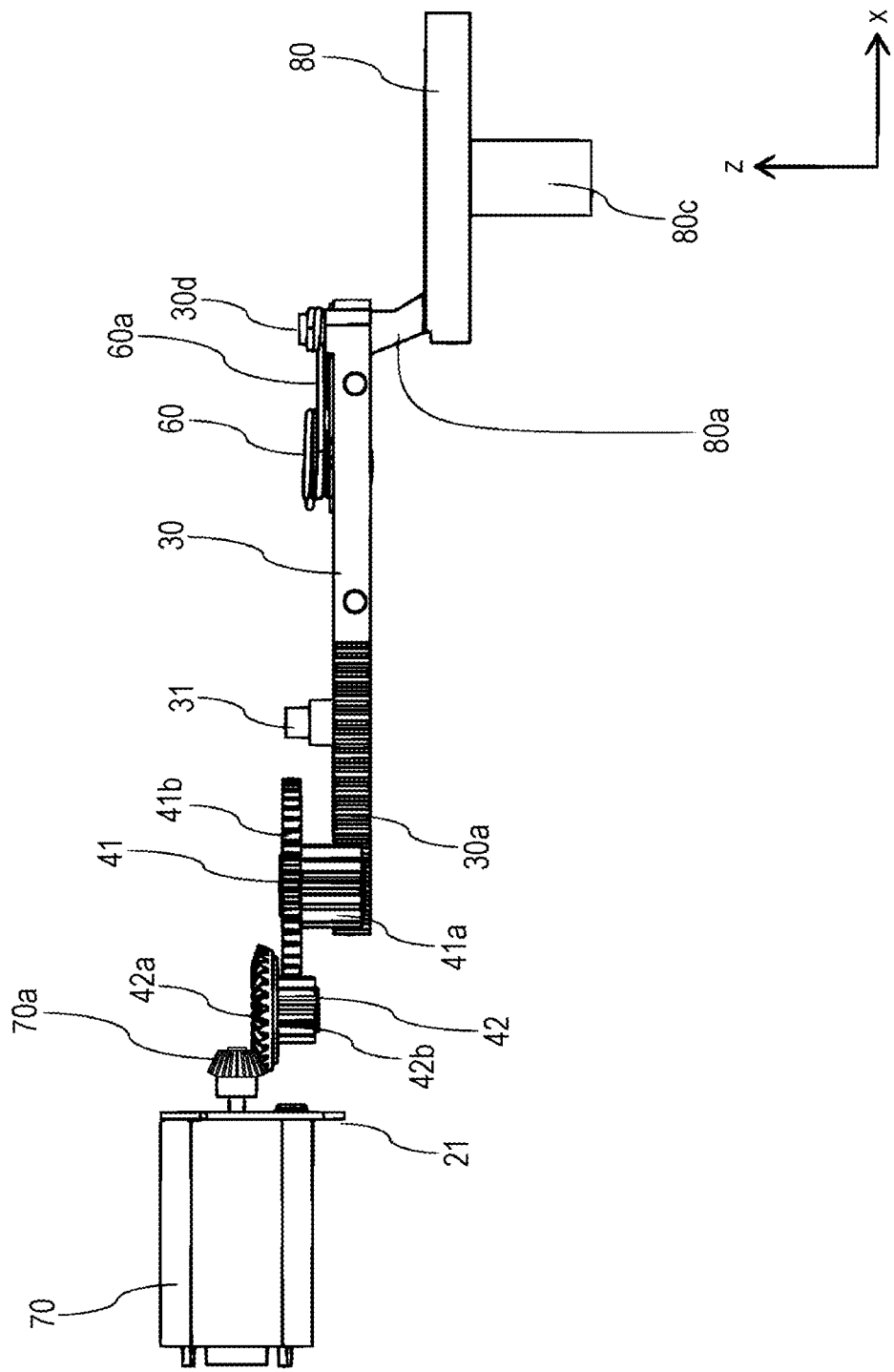
FIG. 5 is a plan view of the drive mechanism included in the imaging device according to the first embodiment viewed from the positive y-direction.

FIGS. 1 to 21 are schematic diagrams of an imaging device (camera) according to the present embodiment. FIGS. 1 and 2 are exploded perspective views of a movable blade mechanism in the imaging device as viewed in different directions. FIGS. 3 to 5 are diagrams of a drive mechanism including components from a motor 70 to a blade 80 connected together. FIG. 3 is a perspective view, FIG. 4 is a plan view viewed from the positive z-direction, and FIG. 5 is a plan view viewed from the positive y-direction.

FIGS. 6 to 13 are diagrams of the movable blade mechanism or the drive mechanism with the blade 80 open. FIGS. 14 to 21 are diagrams of the movable blade mechanism or the drive mechanism with the blade 80 closed. FIGS. 6 to 13 correspond to FIGS. 14 to 21.

Figure 6:
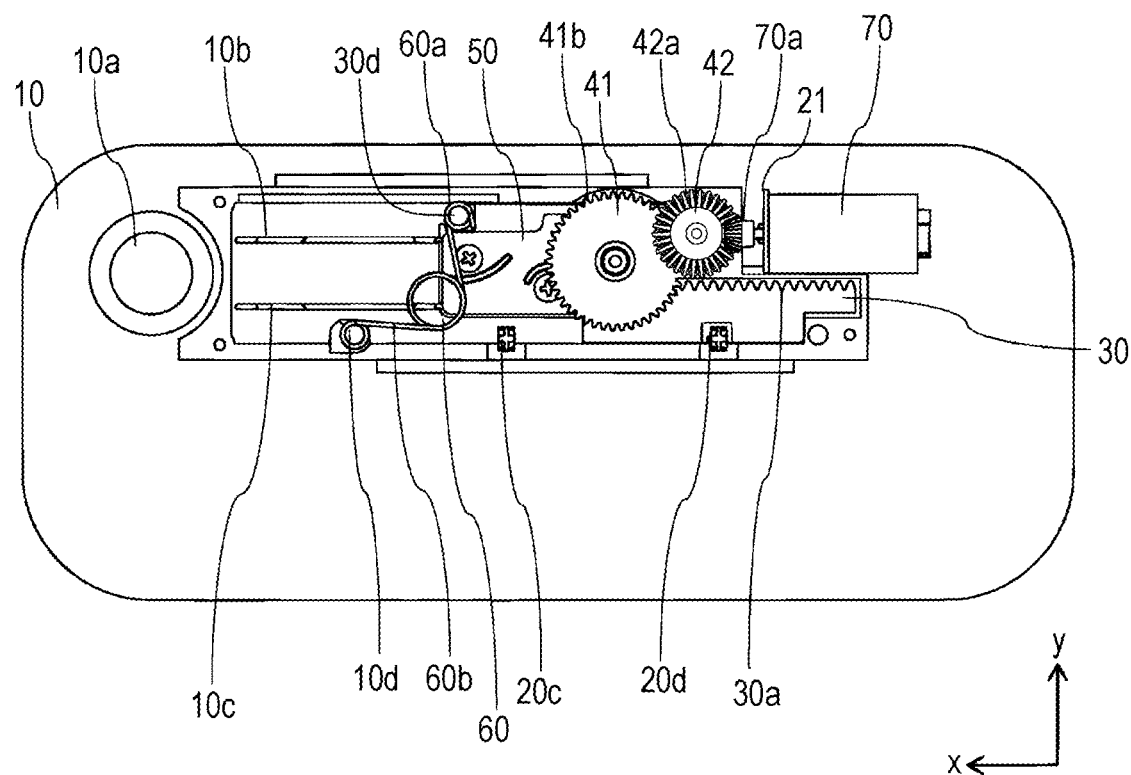
FIG. 6 is a plan view of the movable blade mechanism included in the imaging device according to the first embodiment viewed from the positive z-direction with a blade open.
Figure 7:
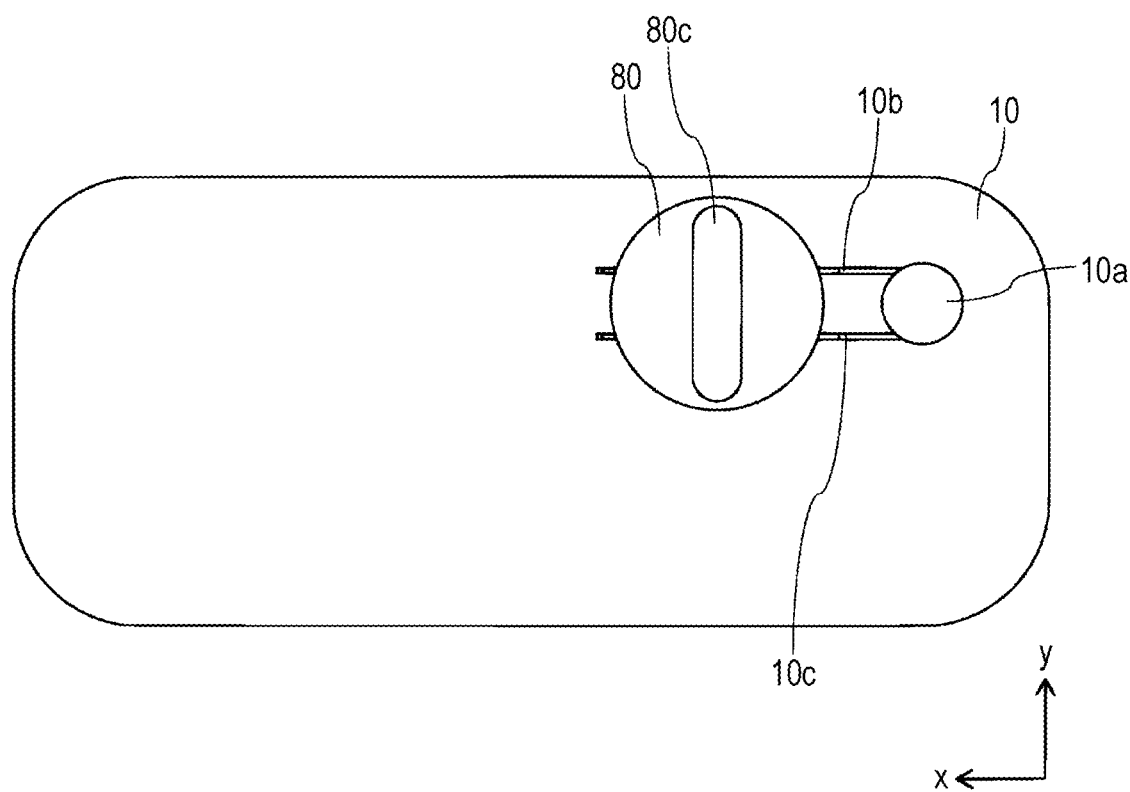
FIG. 7 is a plan view of the movable blade mechanism included in the imaging device according to the first embodiment viewed from the negative z-direction with the blade open.
Figure 8:
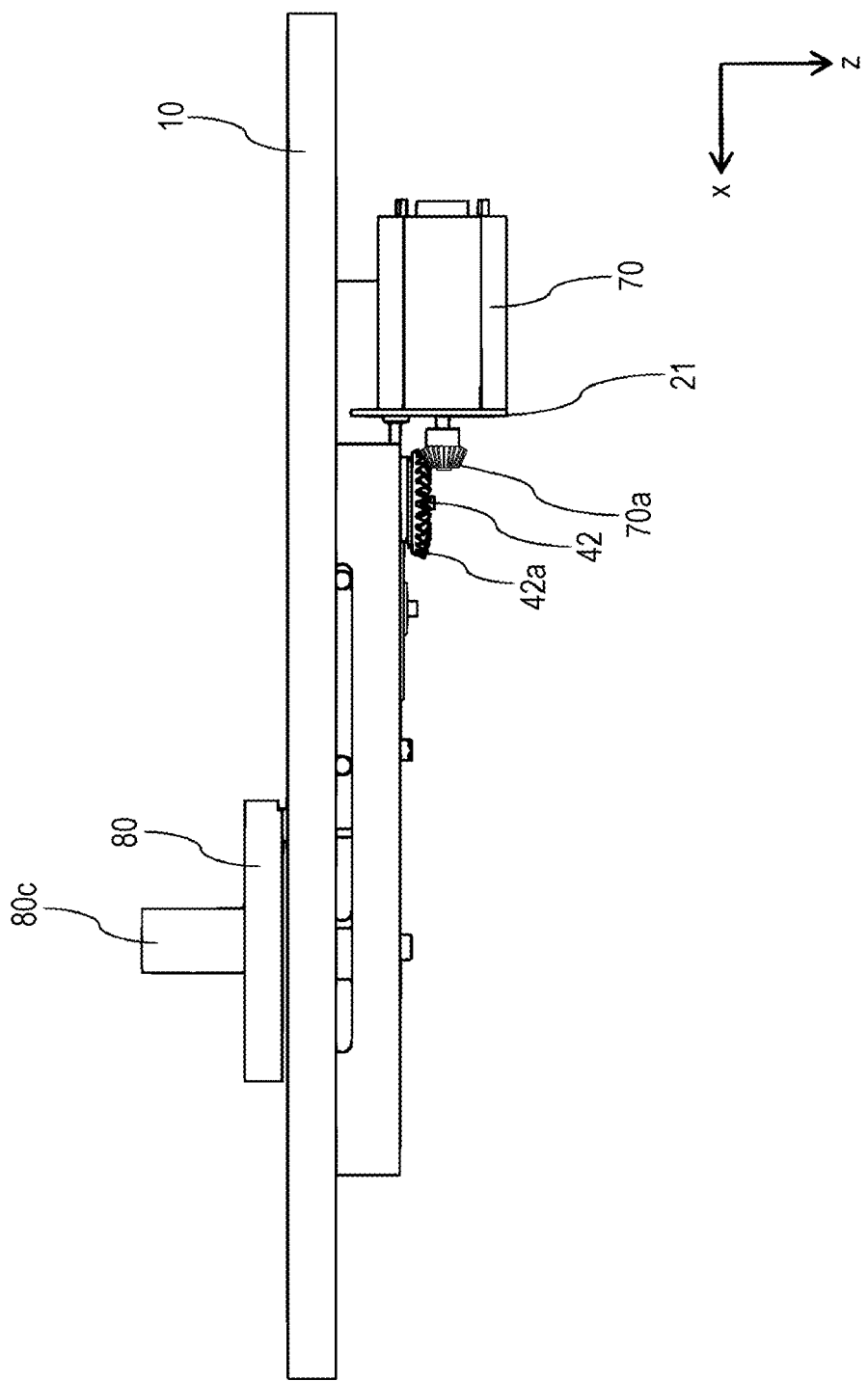
FIG. 8 is a plan view of the movable blade mechanism included in the imaging device according to the first embodiment viewed from the positive y-direction with the blade open.
Figure 9:
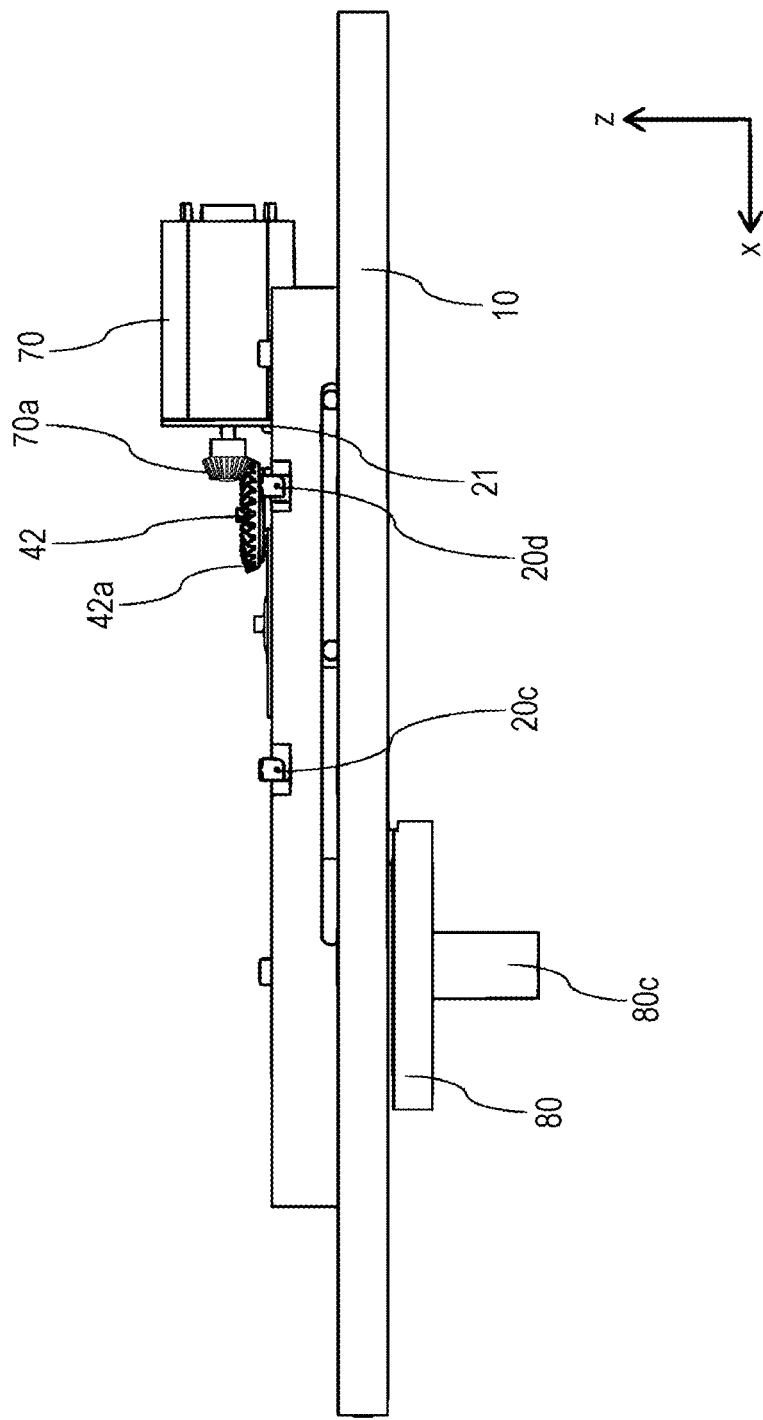
FIG. 9 is a plan view of the movable blade mechanism included in the imaging device according to the first embodiment viewed from the negative y-direction with the blade open.
Figure 10:
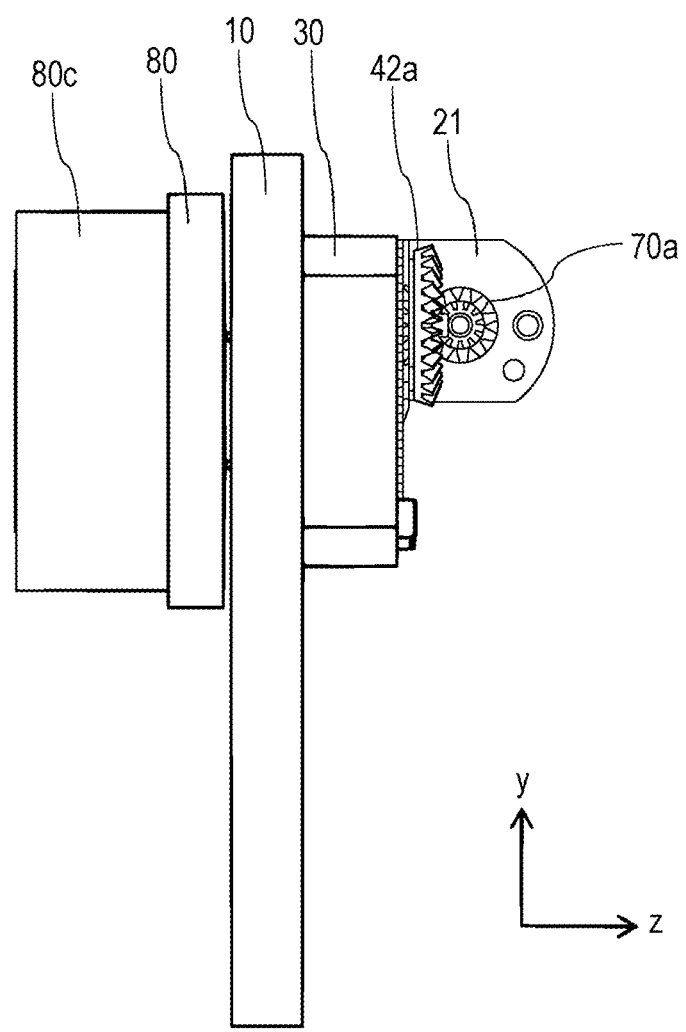
FIG. 10 is a plan view of the movable blade mechanism included in the imaging device according to the first embodiment viewed from the positive x-direction with the blade open.
Figure 11:
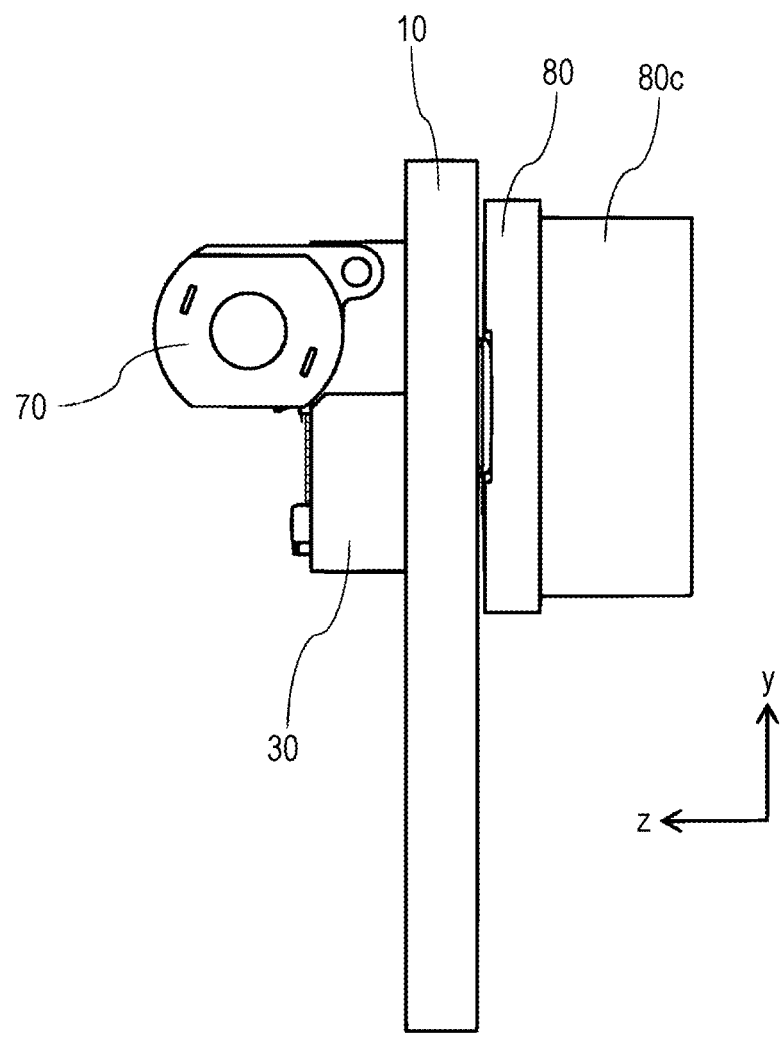
FIG. 11 is a plan view of the movable blade mechanism included in the imaging device according to the first embodiment viewed from the negative x-direction with the blade open.
Figure 12:
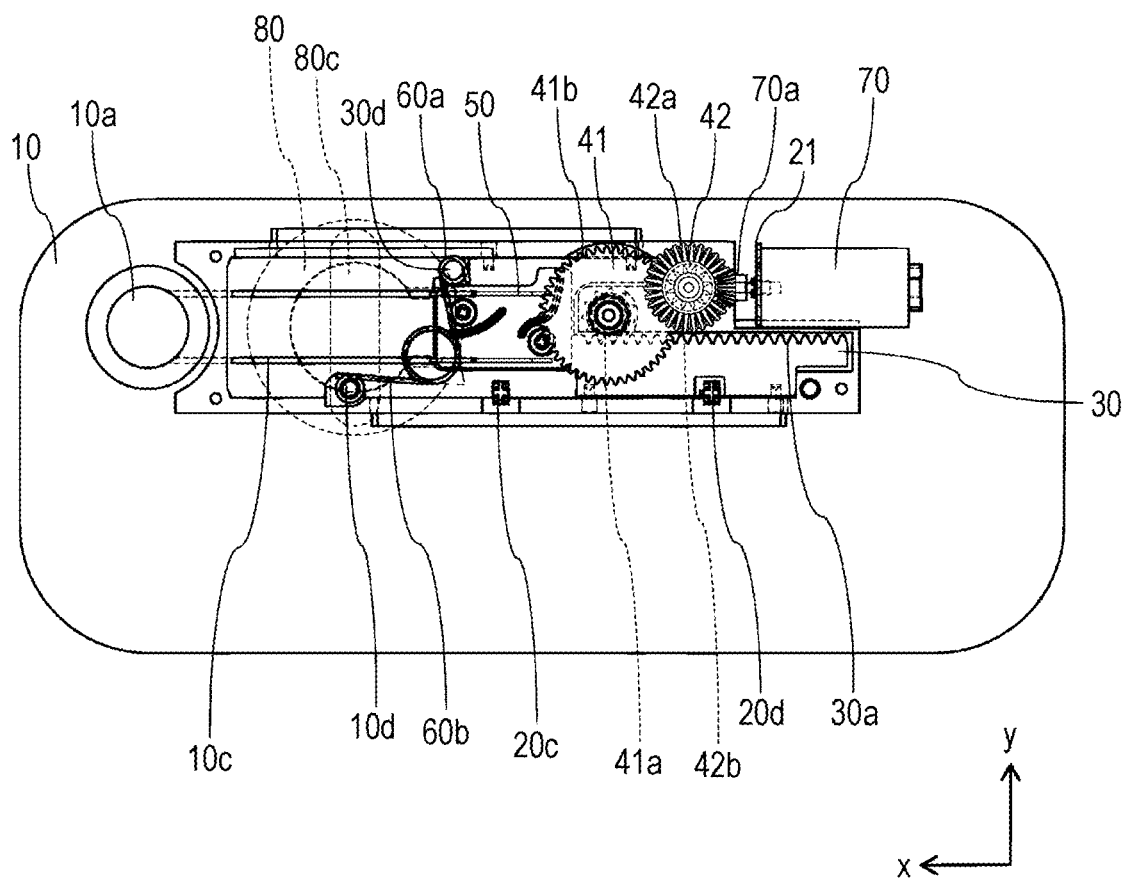
FIG. 12 is a transparent plan view of the movable blade mechanism included in the imaging device according to the first embodiment viewed from the positive z-direction with the blade open.
Figure 13:
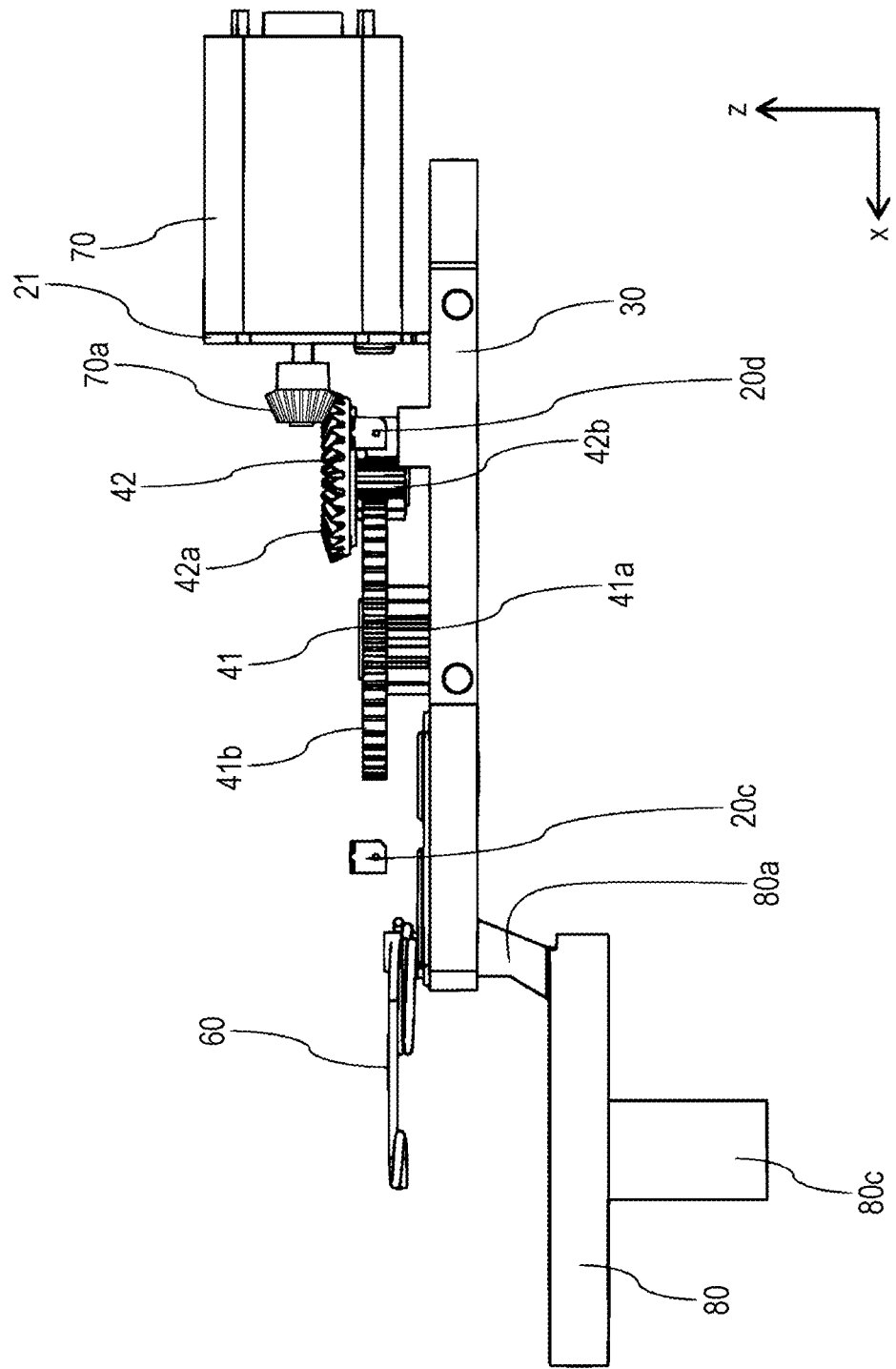
FIG. 13 is a plan view of the drive mechanism included in the imaging device according to the first embodiment viewed from the positive y-direction with the blade open.

FIG. 6 is a plan view of the movable blade mechanism viewed from the positive z-direction. FIG. 7 is a plan view of the movable blade mechanism viewed from the negative z-direction. FIG. 8 is a plan view of the movable blade mechanism viewed from the positive y-direction. FIG. 9 is a plan view of the movable blade mechanism viewed from the negative y-direction. FIG. 10 is a plan view of the movable blade mechanism viewed from the positive x-direction. FIG. 11 is a plan view of the movable blade mechanism viewed from the negative x-direction. FIG. 12 is a plan view of the movable blade mechanism viewed from the positive z-direction. FIG. 13 is a plan view of the drive mechanism for the blade viewed from the positive y-direction.

Figure 14:
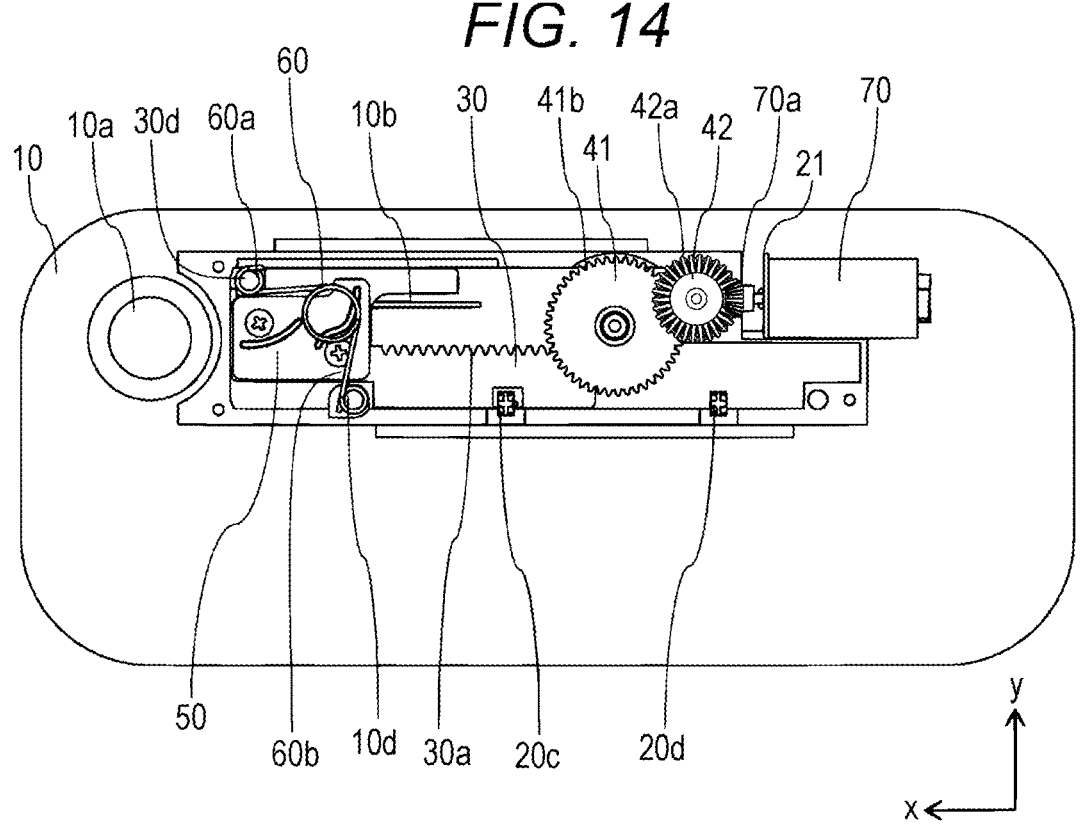
FIG. 14 is a plan view of the movable blade mechanism included in the imaging device according to the first embodiment viewed from the positive z-direction with the blade closed.
Figure 15:
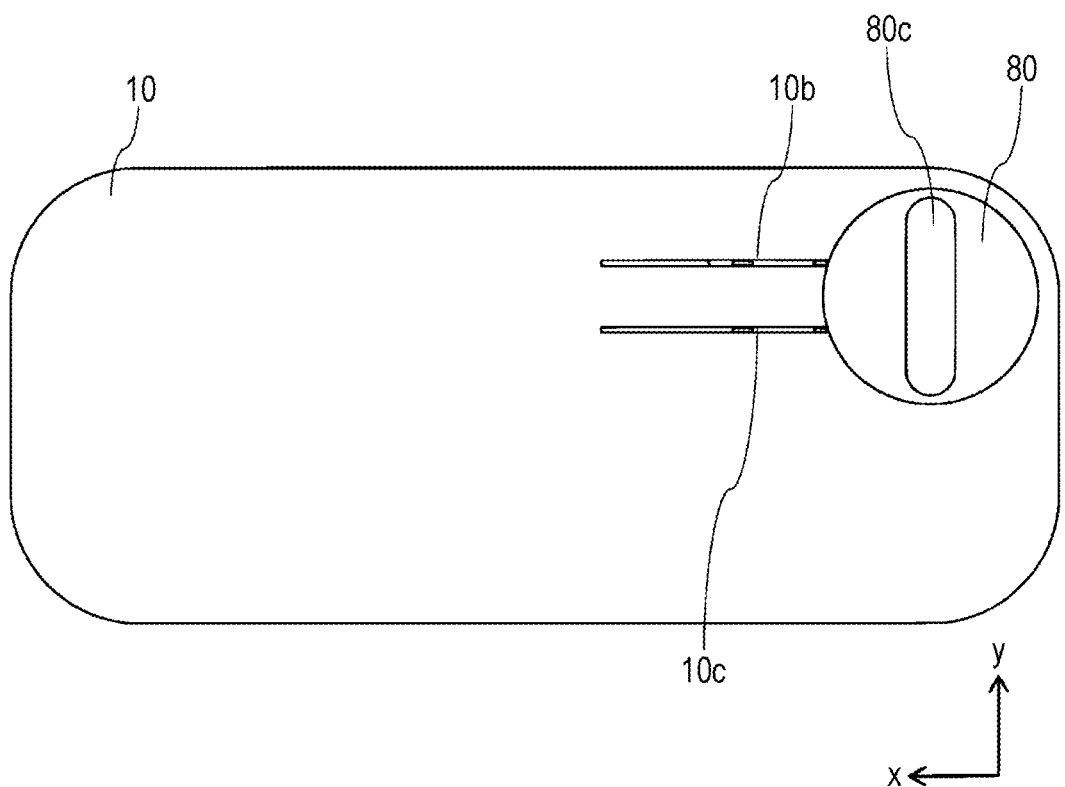
FIG. 15 is a plan view of the movable blade mechanism included in the imaging device according to the first embodiment viewed from the negative z-direction with the blade closed.
Figure 16:
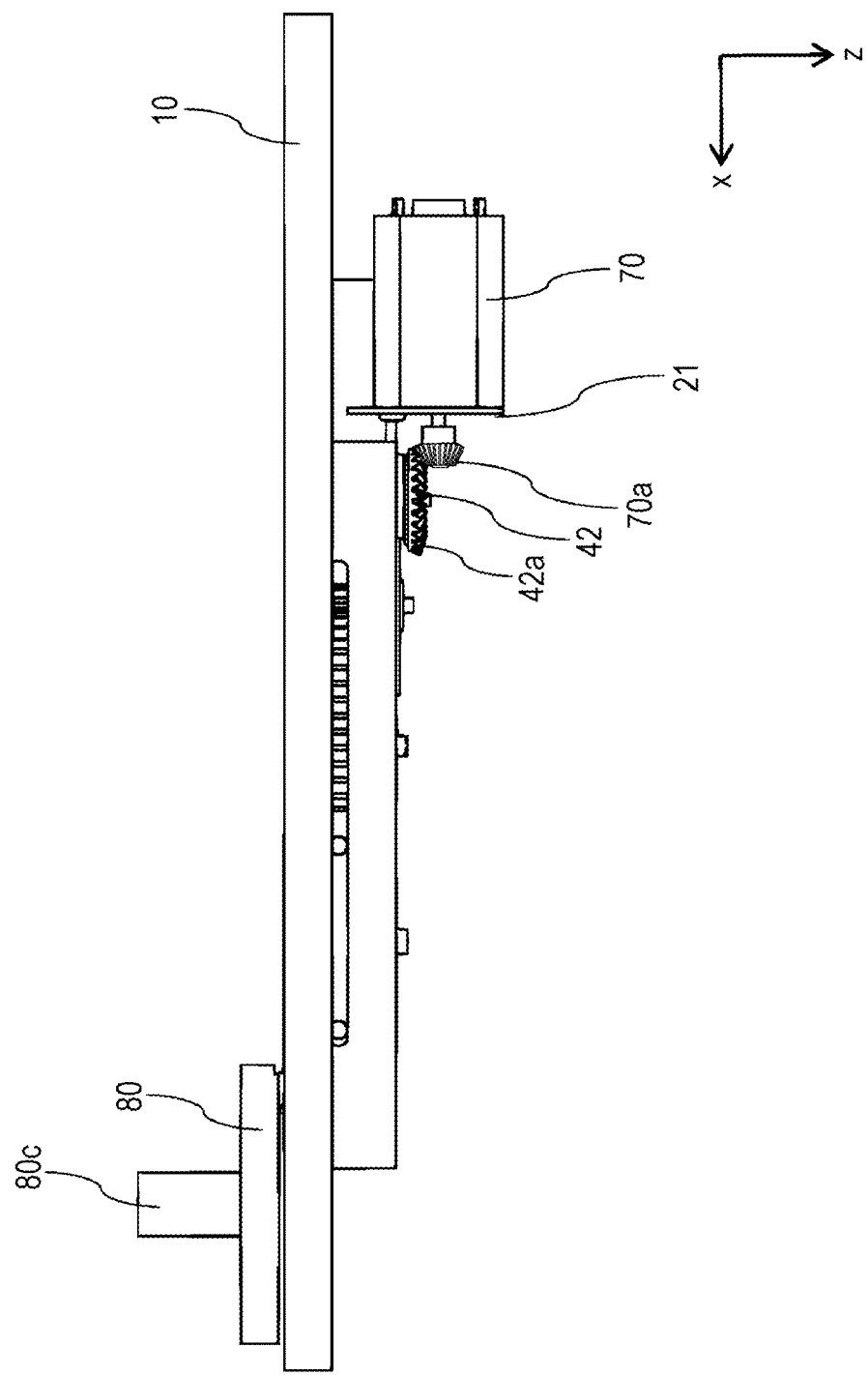
FIG. 16 is a plan view of the movable blade mechanism included in the imaging device according to the first embodiment viewed from the positive y-direction with the blade closed.
Figure 17:
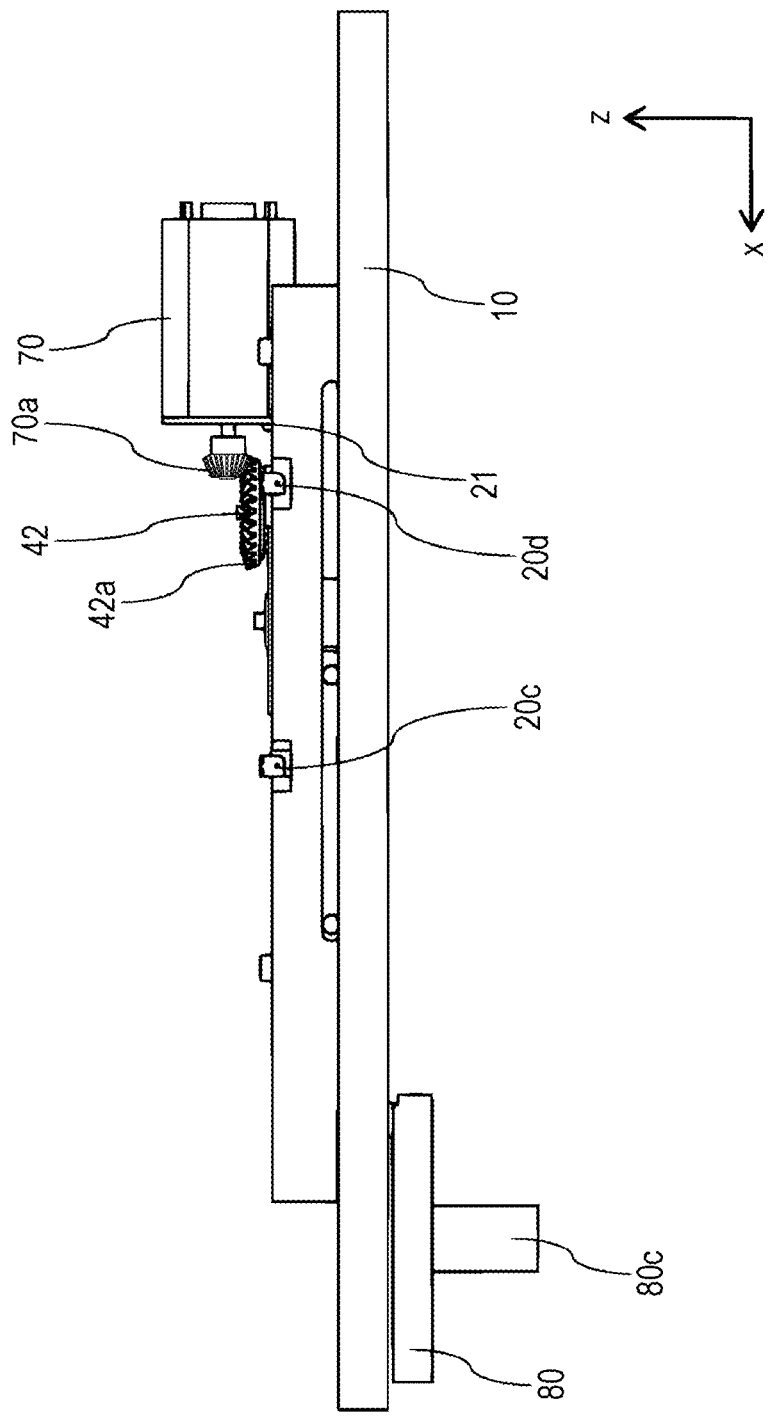
FIG. 17 is a plan view of the movable blade mechanism included in the imaging device according to the first embodiment viewed from the negative y-direction with the blade closed.
Figure 18:
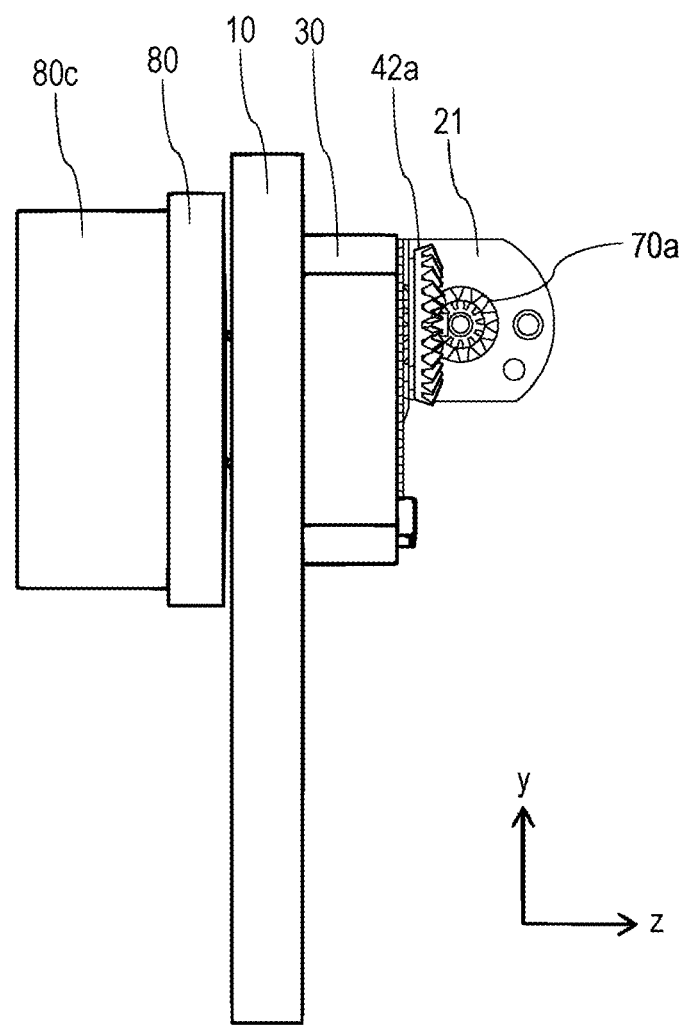
FIG. 18 is a plan view of the movable blade mechanism included in the imaging device according to the first embodiment viewed from the positive x-direction with the blade closed.
Figure 19:
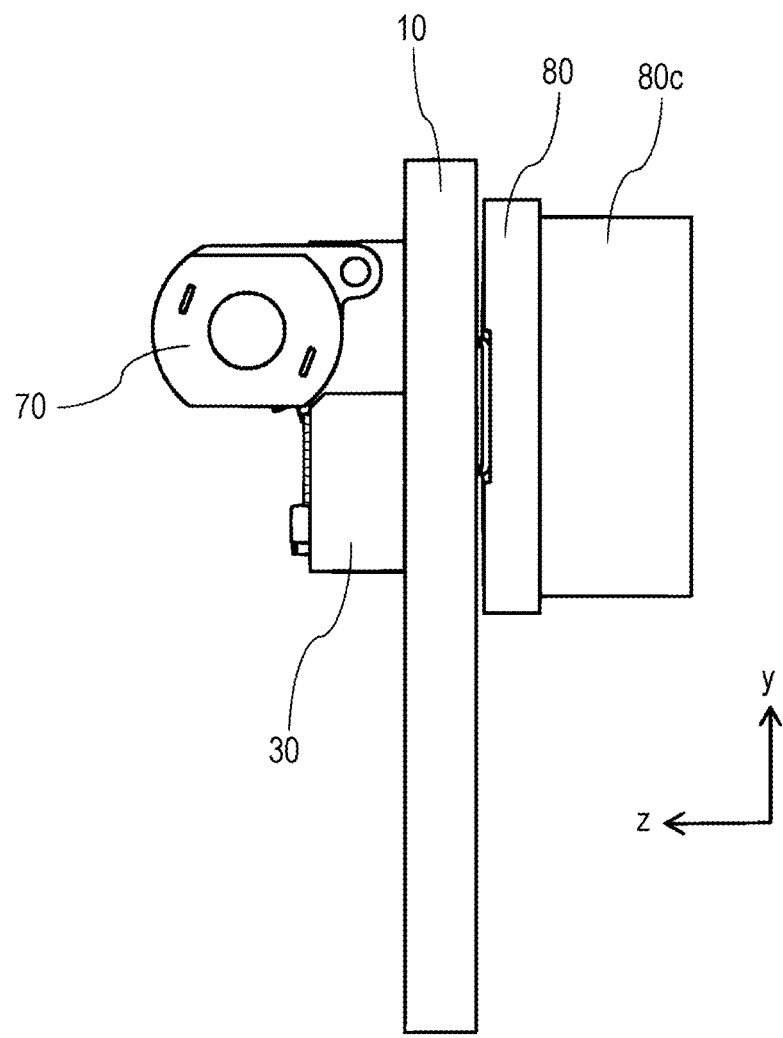
FIG. 19 is a plan view of the movable blade mechanism included in the imaging device according to the first embodiment viewed from the negative x-direction with the blade closed.
Figure 20:
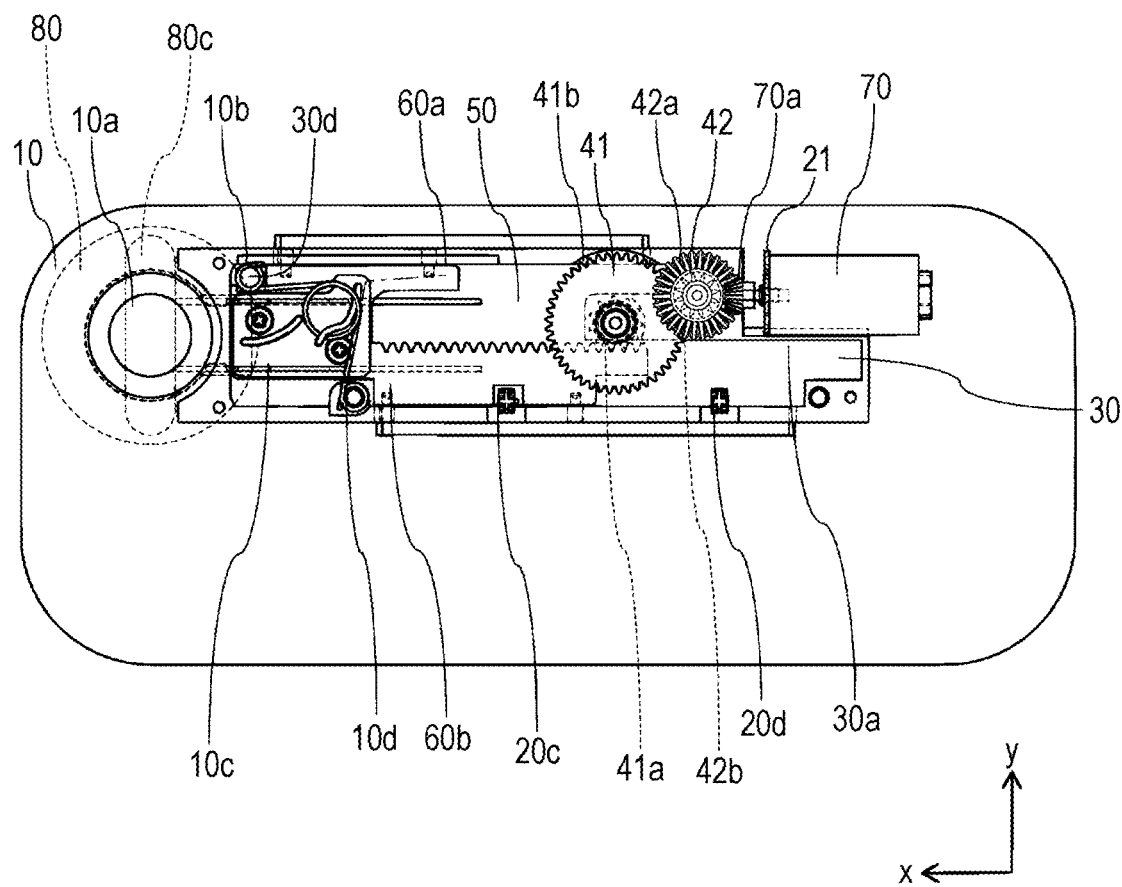
FIG. 20 is a transparent plan view of the movable blade mechanism included in the imaging device according to the first embodiment viewed from the positive z-direction with the blade closed.
Figure 21:
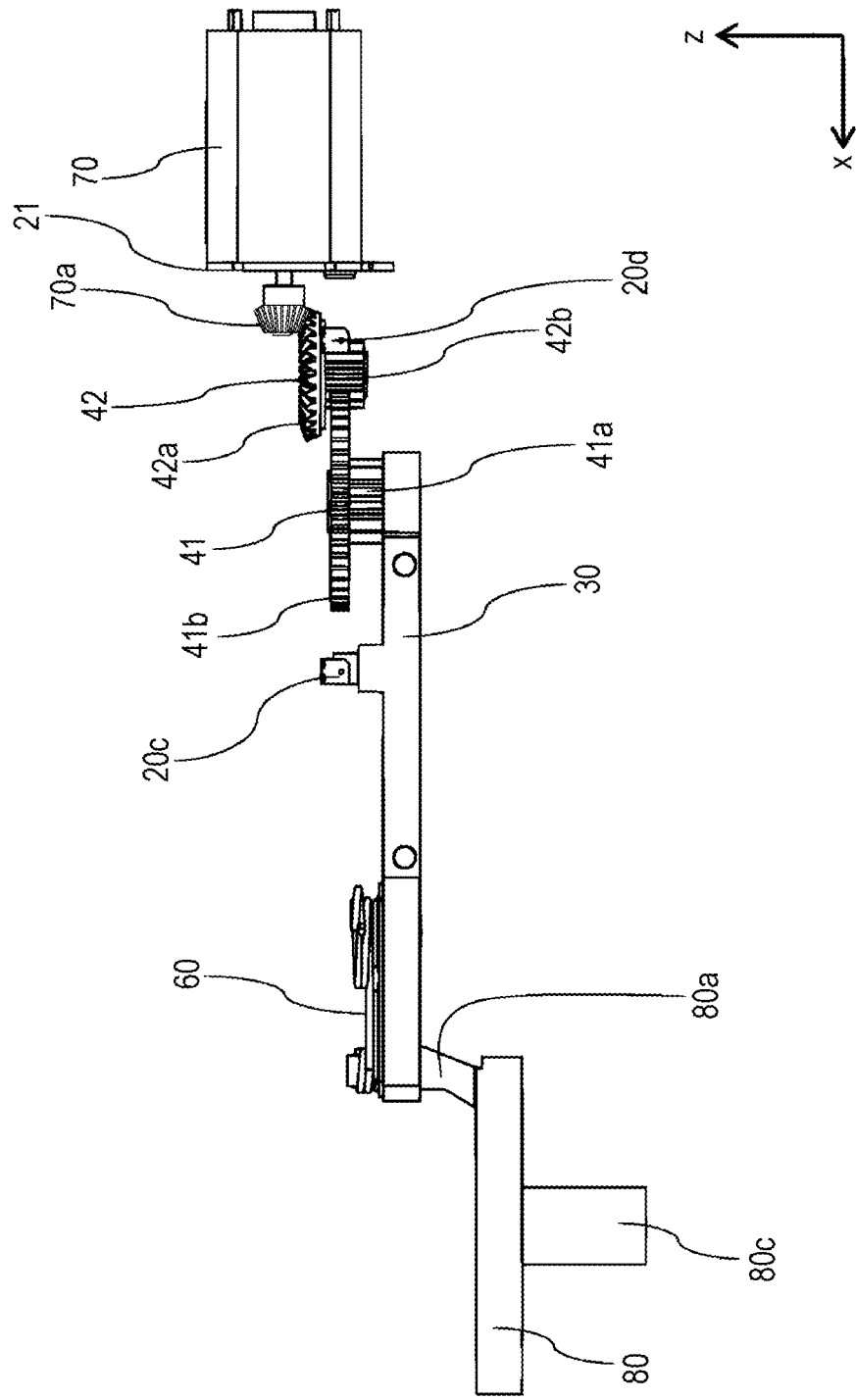
FIG. 21 is a plan view of the drive mechanism included in the imaging device according to the first embodiment viewed from the positive y-direction with the blade closed.

FIG. 14 is a plan view of the movable blade mechanism viewed from the positive z-direction. FIG. 15 is a plan view of the movable blade mechanism viewed from the negative z-direction. FIG. 16 is a plan view of the movable blade mechanism viewed from the positive y-direction. FIG. 17 is a plan view of the movable blade mechanism viewed from the negative y-direction. FIG. 18 is a plan view of the movable blade mechanism viewed from the positive x-direction. FIG. 19 is a plan view of the movable blade mechanism viewed from the negative x-direction. FIG. 20 is a plan view of the movable blade mechanism viewed from the positive z-direction. FIG. 21 is a plan view of the drive mechanism for the blade viewed from the positive y-direction.

Overall Structure of Movable Blade Mechanism

The movable blade mechanism included in the imaging device according to the present embodiment includes a base 10, a cover 20, a slide gear 30, a first gear 41, a second gear 42, an attachment 50, a spring 60, a motor 70, and a blade 80.

Base 10

The base 10 is a plate member as a housing for the movable blade mechanism on the subject end. The base 10 has an opening 10a, which is a circular through-hole formed through the base 10 in z-direction. In the negative x-direction from the opening 10a, guide slots 10b and 10c are formed through the base 10 in z-direction and extend linearly in the negative x-direction. The guide slots 10b and 10c receive arms 80a and 80b of the blade 80.

As shown at least in FIG. 2, the base 10 has shafts 10d, 10e, and 10f on its surface in the positive z-direction. The shafts 10d, 10e, and 10f protrude in the positive z-direction. A second arm 60b of the spring 60 is held on the shaft 10d. The shaft 10e receives the first gear 41. The shaft 10f receives the second gear 42. The base 10 has cutouts 10g and 10h receiving position sensors 20c and 20d.

Cover 20

The cover 20 is attached to the base 10 from a position in the positive z-direction to face the base 10. The base 10 and the cover 20 together define a space accommodating the slide gear 30, the first gear 41, the second gear 42, the attachment 50, and the spring 60. The cover 20 has holes 20a and 20b to receive the shafts 10e and 10f.

The cover 20 includes the position sensors 20c and 20d. The position sensors 20c and 20d are coupled with a light shield 31 and detect the position of the light shield 31 either nearer the position sensor 20c or nearer the position sensor 20d. The position sensors 20c and 20d are, for example, photointerrupters. More specifically, the position sensors 20c and 20d each include a light emitter and a light receiver. The light shield 31 between the emitter and the receiver blocks light to allow detection of the position of the light shield 31. The light shield 31 is connected to the slide gear 30 connected to the blade 80. Thus, the position sensors 20c and 20d and the light shield 31 allow detection of an open state or a closed state of the blade 80. As described later, the position sensors 20c and 20d and the light shield 31 together function as a position detector 121.

The position sensors 20c and 20d are not limited to photointerrupters, and may be photoreflectors or position detectors using Hall elements that detect a position with a magnetic force. When such another sensor is used, the light shield 31 is replaced with a reflector or a magnet depending on the used sensor.

Slide Gear 30

The slide gear 30 is connected to the blade 80 to reciprocate in x-direction relative to the base 10. The slide gear 30 includes a rack gear 30a extending in x-direction. The rack gear 30a meshes with a small gear 41a in the first gear 41. As the first gear 41 rotates, the slide gear 30 moves in x-direction through the rack gear 30a.

The slide gear 30 includes guide slots 30b and 30c formed through the slide gear 30 in z-direction and extending in x-direction. The guide slots 30b and 30c receive the arms 80a and 80b of the blade 80. The slide gear 30 includes a shaft 30d extending in the positive z-direction. A first arm 60a of the spring 60 is held on the shaft 30d. The slide gear 30 has screw holes 30e and 30f, which receive screws Ma and 51b to fix the attachment 50 to the slide gear 30.

The light shield 31 is connected to the slide gear 30. As described above, the light shield 31 is coupled with the position sensors 20c and 20d included in the cover 20 to detect the position of the blade 80, thus allowing determination as to whether the blade 80 is in the open state or the close state.

First Gear 41

The first gear 41 includes the small gear 41a and a large gear 41b having a larger diameter than the small gear 41a. The small gear 41a is coaxial with the large gear 41b, and rotates in coordination with the large gear 41b. The small gear 41a meshes with the rack gear 30a in the slide gear 30. The large gear 41b meshes with a small gear 42b in the second gear 42.

Second Gear 42

The second gear 42 includes the small gear 42b and a large gear 42a having a larger diameter than the small gear 42b. The small gear 42b is coaxial with the large gear 42a, and rotates in coordination with the large gear 42a. As described above, the small gear 42b meshes with the large gear 41b in the first gear 41. The large gear 42a meshes with an output gear 70a included in the motor 70.

Motor 70

The motor 70 rotates with power provided from a blade driver 106 (described later). The motor 70 includes an output shaft protruding in the positive x-direction and the output gear 70a at the tip of the output shaft. The output shaft of the motor 70 is placed through a through-hole in a washer 21 and a through-hole 20e in the cover 20. As described above, the output gear 70a meshes with the large gear 42a in the second gear 42.

Attachment 50

The attachment 50 is located between the slide gear 30 and the spring 60. The attachment 50 is connected to the slide gear 30 with the screws Ma and 51b placed through screw through-holes 50a and 50b.

Spring 60

The spring 60 is a torsion spring having the first arm 60a and the second arm 60b. The spring 60 applies an urging force in the rotation direction. The first arm 60a of the spring 60 is held on the shaft 30d in the slide gear 30. The second arm 60b of the spring 60 is held on the shaft 10d in the base 10. The spring 60 can thus apply an urging force to the slide gear 30 with respect to the base 10. When the blade 80 is in the closed state, the spring 60 applies an urging force to the slide gear 30 in the positive x-direction. When the blade 80 is in the open state, the spring 60 applies an urging force to the slide gear 30 in the positive x-direction. In other words, the spring 60 applies an urging force to the slide gear 30 in the direction to maintain the open state when the blade 80 is open and in the direction to maintain the closed state when the blade 80 is closed. The spring 60 is located in the middle of the area in which the blade 80 is movable and changes its urging direction. The spring 60 is an example of an urging member in an aspect of the present invention. The spring 60 may be replaced with a spring other than a torsion spring or another urging member.

Blade 80

The blade 80 is supported by the base 10 to reciprocate in x-direction along the guide slots 10b, 10c, 30b, and 30c to cover or uncover the opening 10a. The blade 80 is formed from a light shielding material. In the closed state to cover the opening 10a, the blade 80 blocks light incident on an image sensor 111. In the open state to uncover the opening 10a, the blade 80 allows light from the subject end to be incident on the image sensor 111.

The imaging device according to the present embodiment may include a shutter (not shown) separately from the blade 80 as a light shield. In this case, when the blade 80 is the open state, the shutter operates to control the light exposure of (light incident on) the image sensor 111.

The blade 80 has, on its surface in the negative z-direction (on the subject end), a knob 80c protruding in the negative z-direction, which is operable by a user. The user operates the knob 80c to move the blade 80 against the force to maintain the position of the blade 80. The knob 80c is an example of a protrusion in an aspect of the present invention.

The blade 80 may be a filter that partially blocks light to provide an intended effect, rather than a light shield. The blade 80 may have a grid structure to partially block light. The blade 80 is used, for example, as a blade for a shutter.

(2) Functional Structure of Imaging Device in First Embodiment

Figure 22:
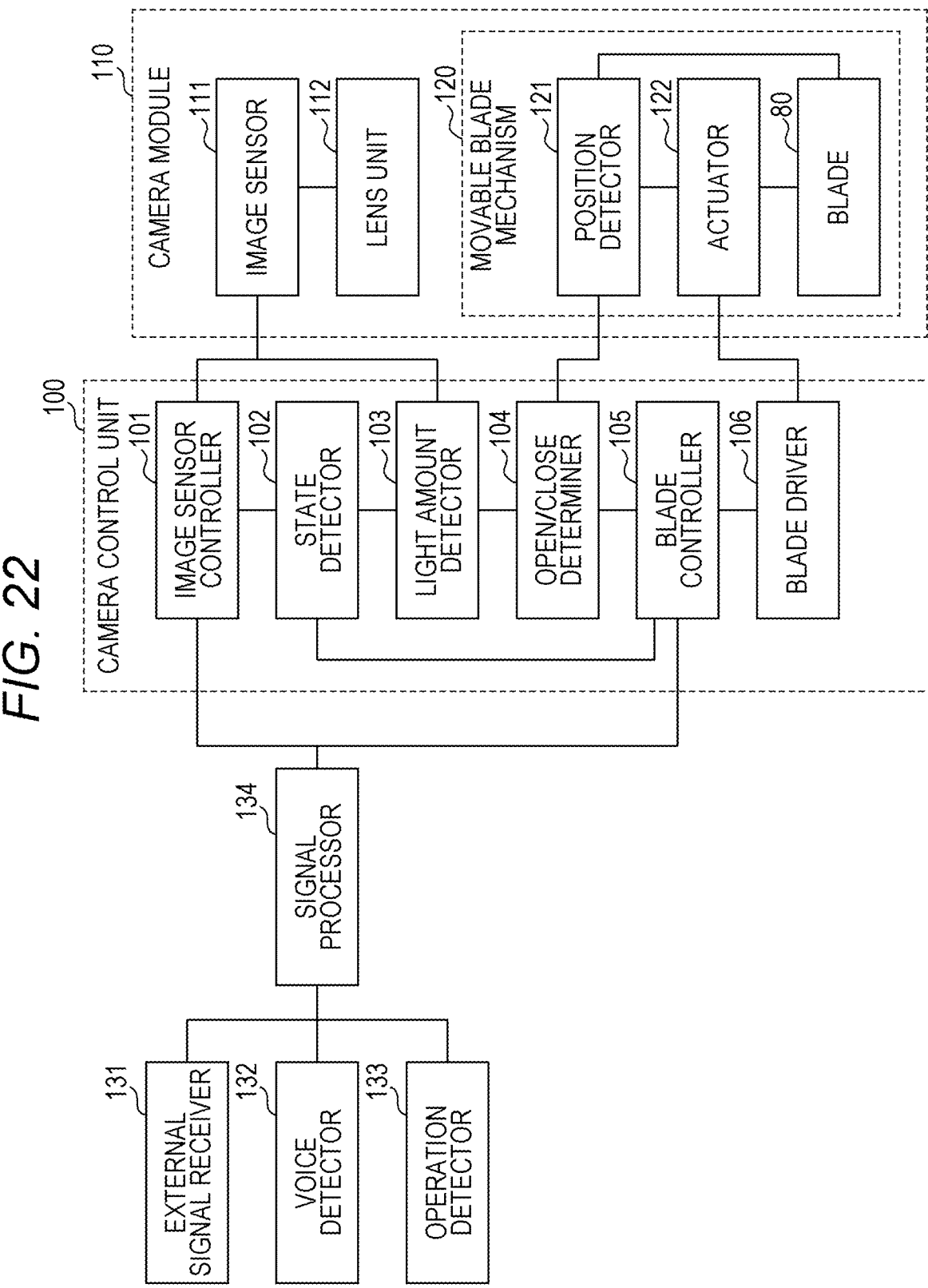
FIG. 22 is a functional block diagram of the imaging device according to the first embodiment.

The functional structure of the imaging device will now be described. The operation of each component may be more specifically described with reference to the flowchart described later. FIG. 22 is a functional block diagram of the imaging device according to the present embodiment. As shown in FIG. 22, the imaging device according to the present embodiment includes a camera control unit 100, a camera module 110, a movable blade mechanism 120, an external signal receiver 131, a voice detector 132, an operation detector 133, and a signal processor 134.

Camera Control Unit 100

The camera control unit 100 includes an image sensor controller 101, a state detector 102, a light amount detector 103, an open/close determiner 104, a blade controller 105, and a blade driver 106.

Image Sensor Controller 101

The image sensor controller 101 controls the operation of the image sensor 111 to capture images. The image sensor controller 101 switches on or off the image sensor 111.

State Detector 102

The state detector 102 detects the state of the imaging device. In the present embodiment, the state detector 102 particularly detects the on or off state of the imaging device.

Light Amount Detector 103

The light amount detector 103 detects the amount of light (degree of light brightness) incident on the image sensor 111.

Open/close Determiner 104

The open/close determiner 104 determines whether the blade 80 in the movable blade mechanism 120 is open or closed based on the result of position detection performed by the position detector 121 included in the movable blade mechanism 120 or the amount of light detected by the light amount detector 103.

Blade Controller 105

The blade controller 105 drives the blade driver 106 based on the inputs from the signal processor 134 and the state detector 102, and controls the operation of the movable blade mechanism 120.

In a non-imaging mode in which imaging is off, the blade controller 105 may constantly apply a force to the slide gear 30 in the positive x-direction to retain the blade 80 in the close state.

Blade Driver 106

The blade driver 106 drives the movable blade mechanism 120 by providing a predetermined voltage and a predetermined current to an actuator 122 as controlled by the blade controller 105.

Camera Module 110

The camera module 110 includes the image sensor 111 and a lens unit 112.

Image Sensor 111

The image sensor 111 is a photoelectric converter that converts incident light to electric signals. The image sensor 111 is, for example, a complementary metal-oxide-semiconductor (CMOS) sensor or a charge-coupled device (CCD), but is not limited to such devices. The image sensor 111 receives light from the subject end through the lens unit 112, converts the light to electric signals, and outputs the signals.

Lens Unit 112

The lens unit 112 allows light from the subject end to pass through the lens unit 112 while refracting the light to gather onto the image sensor 111. The lens unit 112 includes one or more lenses, and may also include an optical member other than a lens, such as a filter.

Movable Blade Mechanism 120

The movable blade mechanism 120 includes the position detector 121, the actuator 122, and the blade 80. The blade 80 has the structure and the function described above.

Actuator 122

The actuator 122 includes the motor 70, the first gear 41, the second gear 42, and the slide gear 30. The actuator 122 moves the blade 80 in x-direction using electric power from an external source to cover and uncover the opening 10a.

Position Detector 121

The position detector 121 includes the position sensors 20c and 20d, and the light shield 31. As described above, the position detector 121 includes, for example, optical sensors, such as photointerrupters. The position detector 121 detects the position of the blade 80 to detect the open or closed state of the blade 80.

External Signal Receiver 131

The external signal receiver 131 receives external signals through wired or wireless communication, and outputs the signals to the signal processor 134.

Voice Detector 132

The voice detector 132 detects a voice, such as a voice of the user, to allow a process corresponding to the detected voice.

Operation Detector 133

The operation detector 133 detects operational information input to the imaging device from, for example, the user. More specifically, the operation detector 133 detects signals input through, for example, a keyboard, a mouse, a touch screen, and a voice. The operation detector 133 may detect a user input performed in a manner other than the above manners.

Signal Processor 134

The signal processor 134 controls predetermined components included in the imaging device to perform predetermined operations based on, for example, the detection results obtained from the external signal receiver 131, the voice detector 132, and the operation detector 133.

(3) Operation of Imaging Device in First Embodiment

Figure 23:
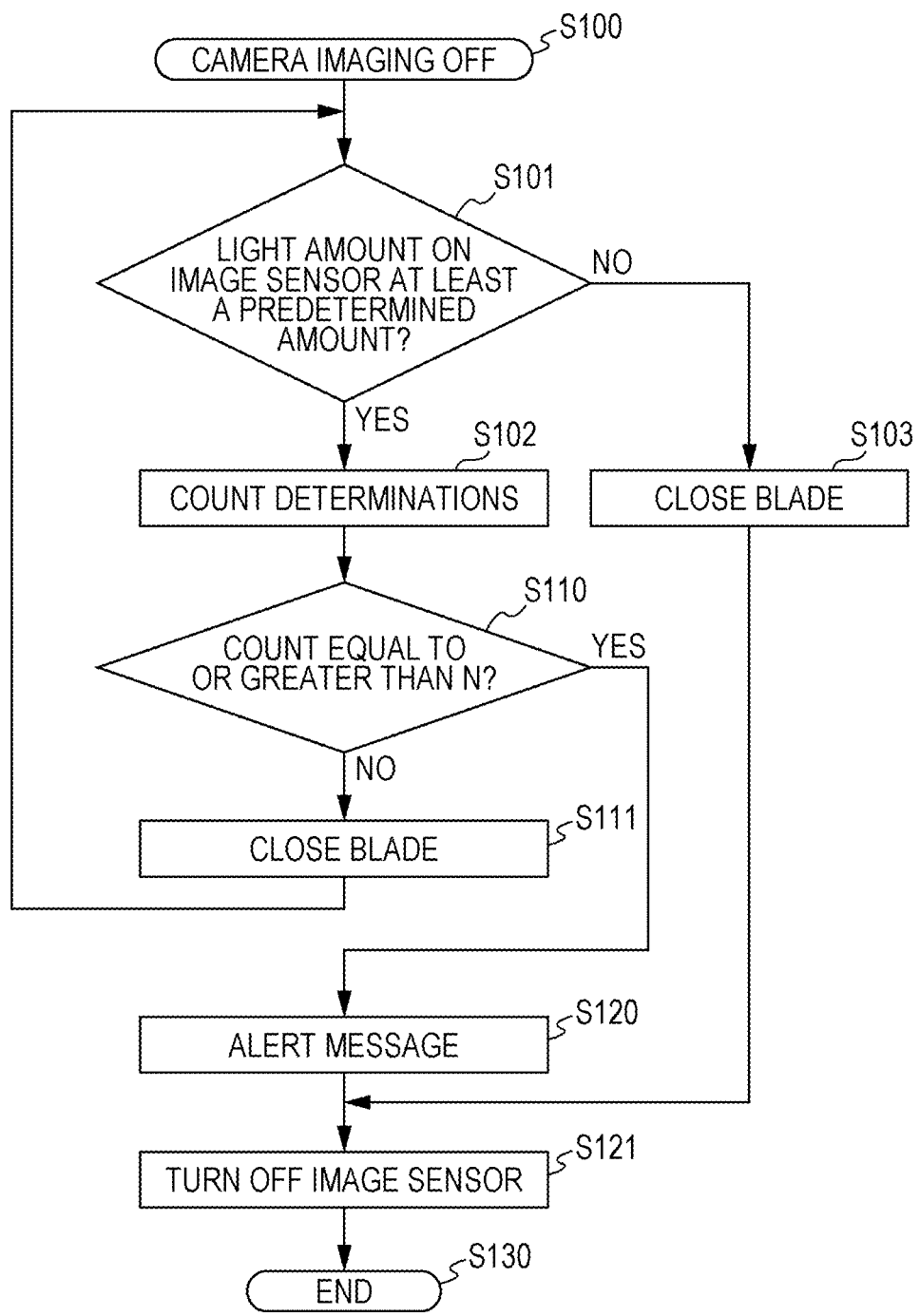
FIG. 23 is a flowchart showing the operation of the imaging device according to the first embodiment.

The opening/closing operation of the blade in the imaging device according to the present embodiment will now be described with reference to the flowchart in FIG. 23.

S100

The opening/closing operation of the blade 80 according to the present embodiment in the non-imaging mode in which camera imaging is off will be now be described (S100). The other processes including image capturing are performed in known manners.

S101

The open/close determiner 104 first determines whether the amount of light incident on the image sensor 111, which is detected by the light amount detector 103, is at least a predetermined amount (S101). The determination as to whether the amount of light is at least the predetermined amount is performed by determining whether the detected amount of light is greater than a predetermined threshold. In other words, the open/close determiner 104 determines, with the image sensor 111, whether the detected amount of light is the amount for the open state of the blade 80 or the amount for the closed state of the blade 80. When the processing in S101 is first performed, the image sensor 111 is powered on. In another embodiment, the image sensor 111 may be powered on at the start of the process in S100.

S102

When the open/close determiner 104 determines that the amount of light is at least the predetermined amount (YES in S101), the open/close determiner 104 counts the number of times the amount of light is determined to be at least the predetermined amount (S102).

NO in S110, to S111

When the count for the amount of light determined to be at least the predetermined amount is less than a natural number N (NO in S110), the blade controller 105 drives the actuator 122 with the blade driver 106 to close the blade 80 (S111). The count is reset at the start of the process in the flowchart.

YES in S110, to S120

When the count for the amount of light determined to be at least the predetermined amount is equal to or greater than the natural number N, indicating that the blade 80 is not closed after repeatedly controlled to be closed (YES in S110), an alert message is provided to the user (S120). For example, the imaging device may output, to the user, a voice message or an image message indicating that the blade 80 cannot be closed. The processing then advances to S121.

NO in S101, to S103

When the open/close determiner 104 determines that the amount of light is less than the predetermined amount (NO in S101), the blade controller 105 drives the actuator 122 with the blade driver 106 to close the blade 80 (S103). This includes the processing for the open/close determiner 104 erroneously detecting a closed state in dark surroundings although the blade 80 is actually open.

S121 to S130

After the processing in S103 or S120, the image sensor controller 101 stops the operation of the image sensor 111 (S121), and ends the process (S130). When the operation of the image sensor 111 has been already stopped, no particular processing is performed in this step.

The process described above is performed at every predetermined time in the non-imaging mode in which imaging with a camera is off. In another embodiment, the process may be performed when the camera function is deactivated or at other various times.

(4) First Modification

Figure 24:
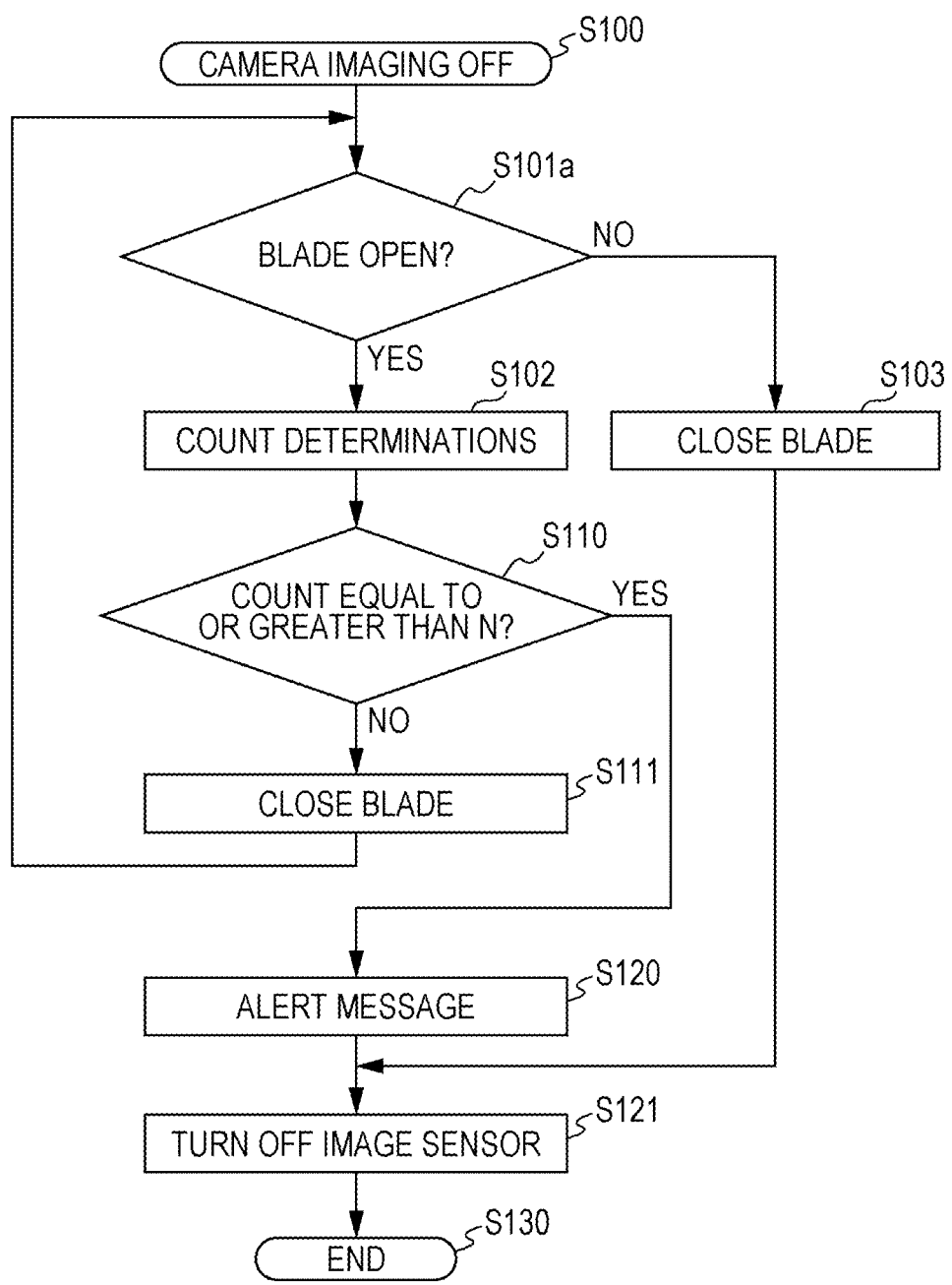
FIG. 24 is a flowchart showing the operation of an imaging device according to a first modification of the first embodiment.

A first modification of the present embodiment will now be described with reference to the flowchart in FIG. 24. The present modification differs from the first embodiment in some steps performed in the non-imaging mode. The other structures and processing are the same as in the first embodiment. The modification will be described focusing on its differences from the first embodiment, without the same structures and processing being described.

S101*a*

In the present modification, the open/close determiner 104 determines whether the blade 80 is open or closed with the position detector 121 included in the movable blade mechanism 120, rather than with the light amount detector 103. When the blade 80 is determined to be open, the processing in S102 and subsequent steps are performed. When the blade 80 is determined to be closed, the processing in S103 and subsequent steps are performed.

(5) Second Modification

Figure 25:
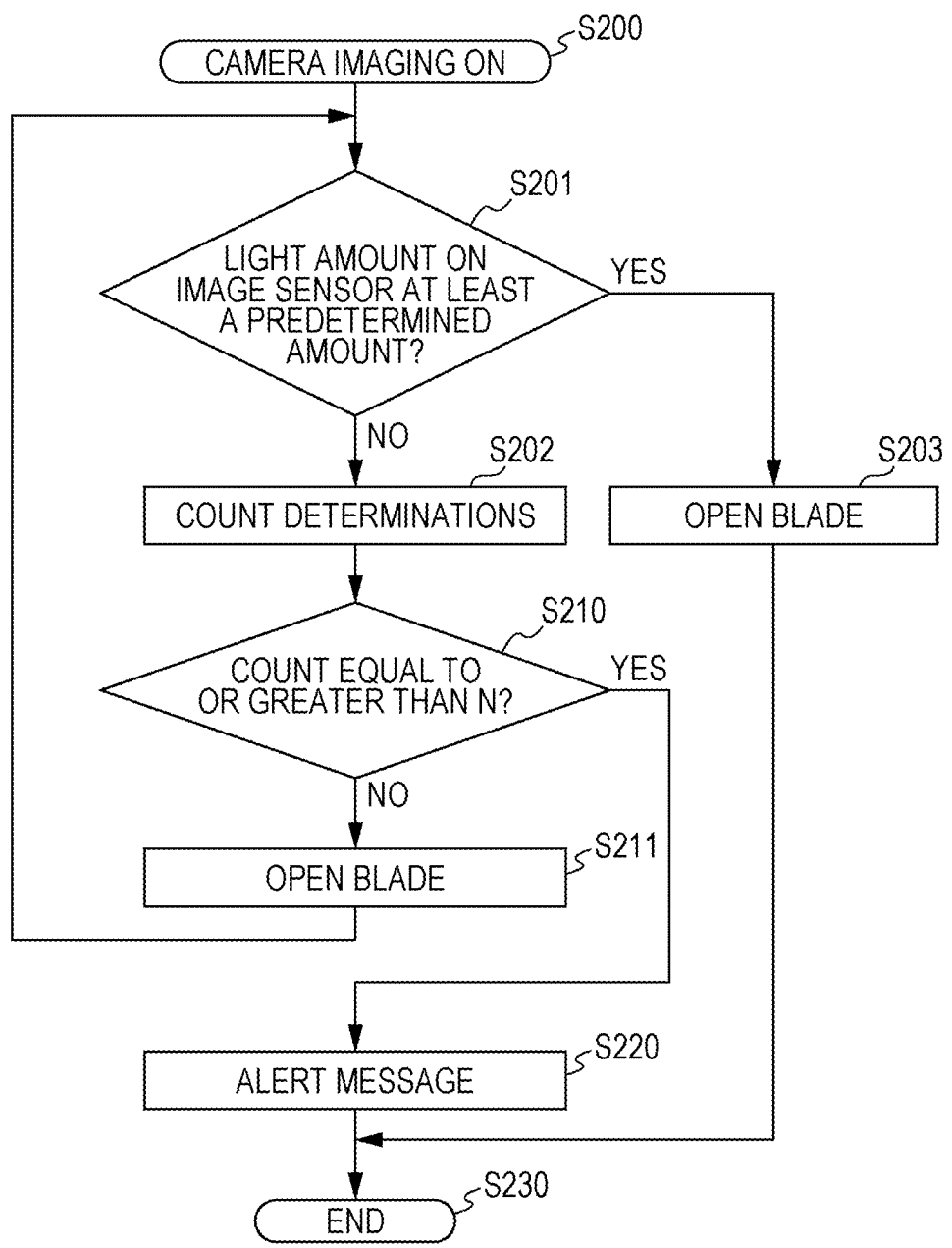
FIG. 25 is a flowchart showing the operation of an imaging device according to a second modification of the first embodiment.

A second modification of the present embodiment will now be described with reference to the flowchart in FIG. 25. The present modification differs from the first embodiment in the processing performed in an imaging mode in which imaging with a camera is on. The other structures and processing are the same as in the first embodiment. The modification will be described focusing on its differences from the first embodiment, without the same structures and processing being described.

S200

The opening/closing operation of the blade 80 according to the present modification in the imaging mode in which camera imaging is on will now be described (S200). The other processes including image capturing are performed in known manners.

S201

The open/close determiner 104 first determines whether the amount of light incident on the image sensor 111, which is detected by the light amount detector 103, is at least a predetermined amount (S201). The determination as to whether the amount of light is at least the predetermined amount is performed by determining whether the detected amount of light is greater than a predetermined threshold. In other words, the open/close determiner 104 determines, with the image sensor 111, whether the detected amount of light is the amount for the open state of the blade 80 or the amount for the closed state of the blade 80.

S202

When the open/close determiner 104 determines that the amount of light is less than the predetermined amount (NO in S201), the open/close determiner 104 counts the number of times the amount of light is determined to be less than the predetermined amount (S202). The count is reset at the start of the process in the flowchart.

NO in S210, to S211

When the count for the amount of light determined to be less than the predetermined amount is less than a natural number N (NO in S210), the blade controller 105 drives the actuator 122 with the blade driver 106 to open the blade 80 (S211).

YES in S210, to S220

When the count for the amount of light determined to be less than the predetermined amount is equal to or greater than the natural number N, indicating that the blade 80 is not opened after repeatedly controlled to be opened (YES in S210), an alert message is provided to the user (S220). For example, the imaging device may output, to the user, a voice message or an image message indicating that the blade 80 cannot be opened.

YES in S201, to S203

When the open/close determiner 104 determines that the amount of light is at least the predetermined amount (YES in S201), the blade controller 105 drives the actuator 122 with the blade driver 106 to open the blade 80 (S203). This includes the processing for the open/close determiner 104 erroneously detecting a closed state in bright surroundings although the blade 80 is actually open.

S230

After the processing in S203 or S220, the opening/closing process of the blade ends (S230). When the operation of the image sensor 111 has been already stopped, no particular processing is performed in this step.

The above process is performed at, for example, every predetermined time, activation of the imaging device, activation of the electronic device including the imaging device, or detection of vibration with an acceleration sensor or an angular velocity sensor.

(6) Third Modification

Figure 26:
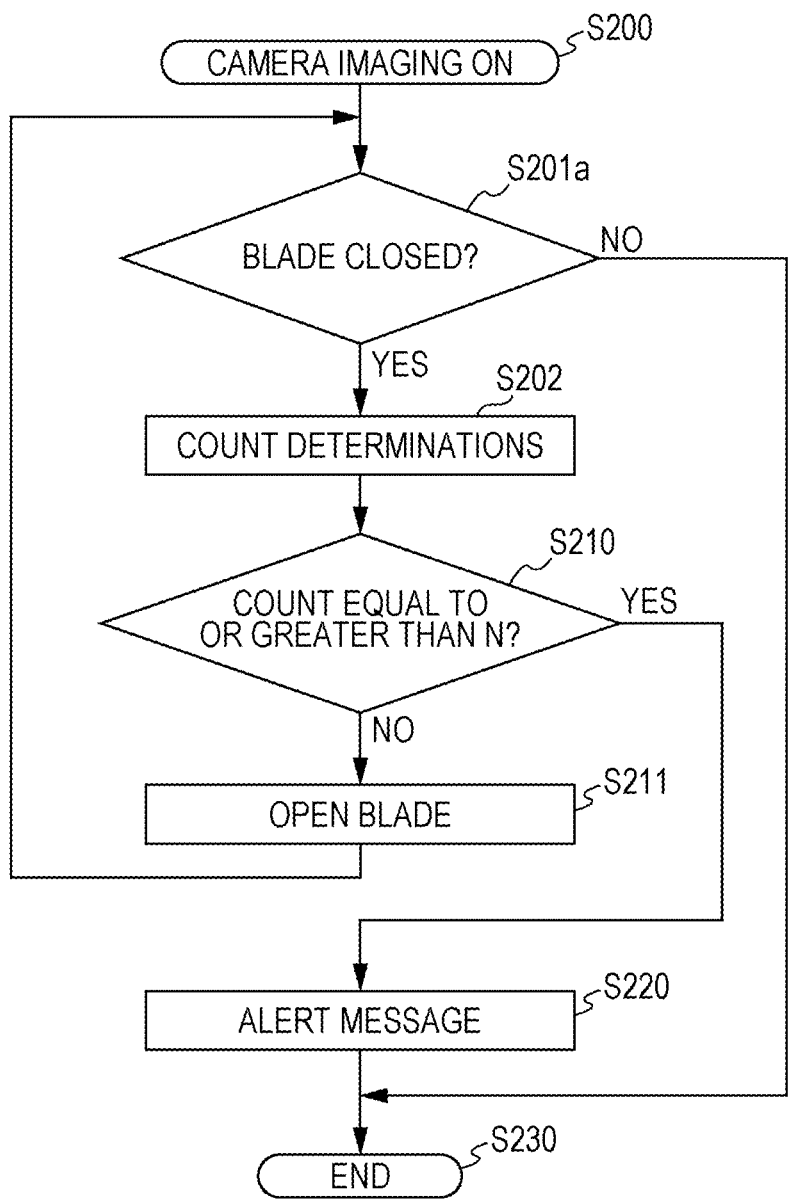
FIG. 26 is a flowchart showing the operation of an imaging device according to a third modification of the first embodiment.

A third modification of the present embodiment will now be described with reference to the flowchart in FIG. 26. The present modification differs from the second modification in some steps performed in the imaging mode. The other structures and processing are the same as in the second modification. The modification will be described focusing on its differences from the second modification, without the same structures and processing being described.

S201a

In the present modification, the open/close determiner 104 determines whether the blade 80 is open or closed with the position detector 121 included in the movable blade mechanism 120, rather than with the light amount detector 103. When the blade 80 is determined to be closed, the processing in S202 and subsequent steps are performed. When the blade 80 is determined to be open, the process ends (S230).

(7) Fourth Modification

A fourth modification of the present embodiment will now be described with reference to the schematic diagrams in FIGS. 27 and 28. The present modification below will be described focusing on its differences from the first embodiment, without the same structures and processing being described.

Figure 27:
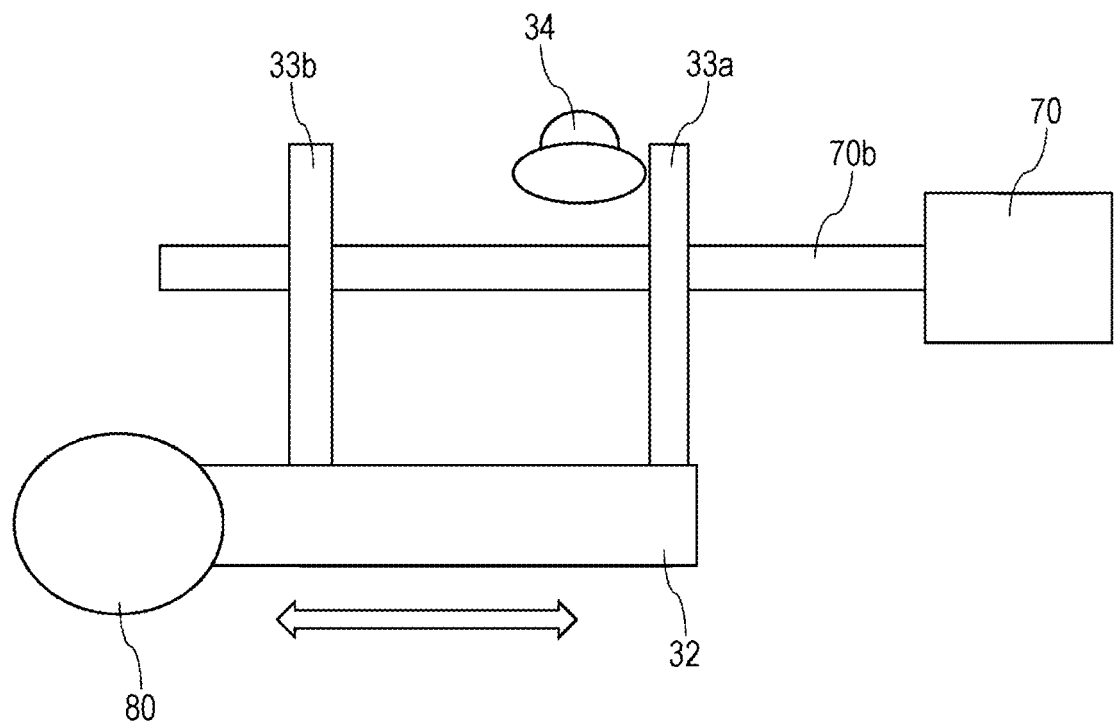
FIG. 27 is a diagram of an imaging device according to a fourth modification of the first embodiment with a blade closed.
Figure 28:
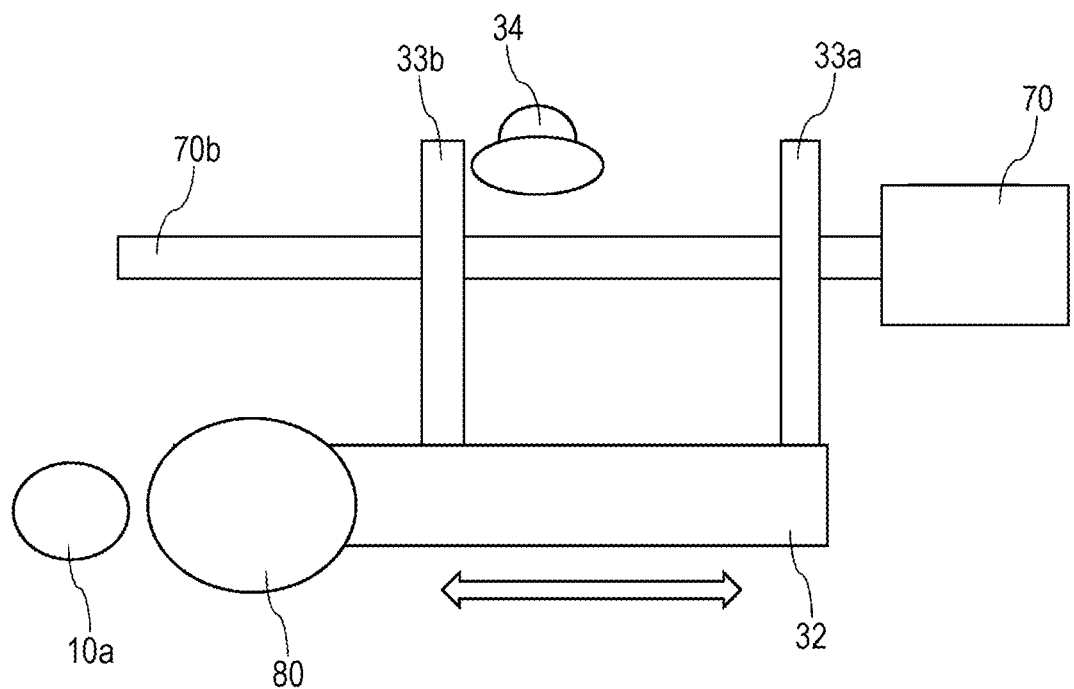
FIG. 28 is a diagram of the imaging device according to the fourth modification of the first embodiment with the blade open.

FIGS. 27 and 28 are schematic diagrams of a movable blade mechanism included in an imaging device according to the present modification. FIG. 27 shows the blade 80 in the closed state. FIG. 28 shows the blade 80 in the open state.

The imaging device according to the present modification includes a blade 80, a motor 70, a motor output 70b, a slide gear 32, protrusions 33a and 33b, and a sound member 34.

The blade 80 and the motor 70 have the same structures and functions as described in the first embodiment. The motor output 70b is connected to the output shaft of the motor 70 to reciprocate the blade 80 through the protrusions 33a and 33b and the slide gear 32. In other words, the motor output 70b changes the positions of the protrusions 33a and 33b and the slide gear 32 in an axial direction.

As shown in FIGS. 27 and 28, when the blade 80 is in the closed state, the protrusion 33a is in contact with the sound member 34. When the blade 80 is in the open state, the protrusion 33b is in contact with the sound member 34. The sound member 34 is a bell that generates a machine sound when hit by the protrusion 33a or 33b. More specifically, when the state of the blade 80 changes from the closed to open state and from the open to closed state, the sound member 34 generates a machine sound. The user can thus notice the state change of the blade 80 between the open state and the closed state.

Although the sound member 34 is a bell that generates a machine sound in the present modification, the sound member 34 is not limited to such a member. More specifically, the sound member 34 may include any structure that generates a machine or electronic sound when the state of the blade 80 changes between the open state and the closed state. The sound member 34 is an example of a sound output unit in an aspect of the present invention.

(8) Fifth Modification

Figure 29:
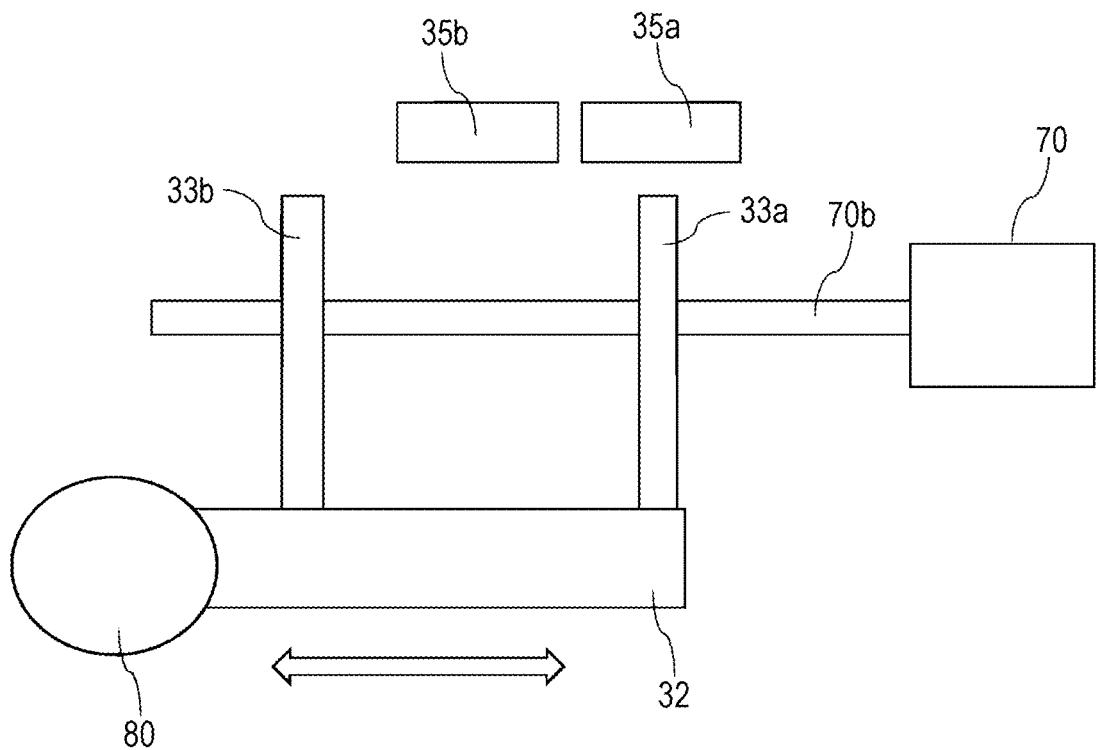
FIG. 29 is a diagram of an imaging device according to a fifth modification of the first embodiment with a blade closed.
Figure 30:
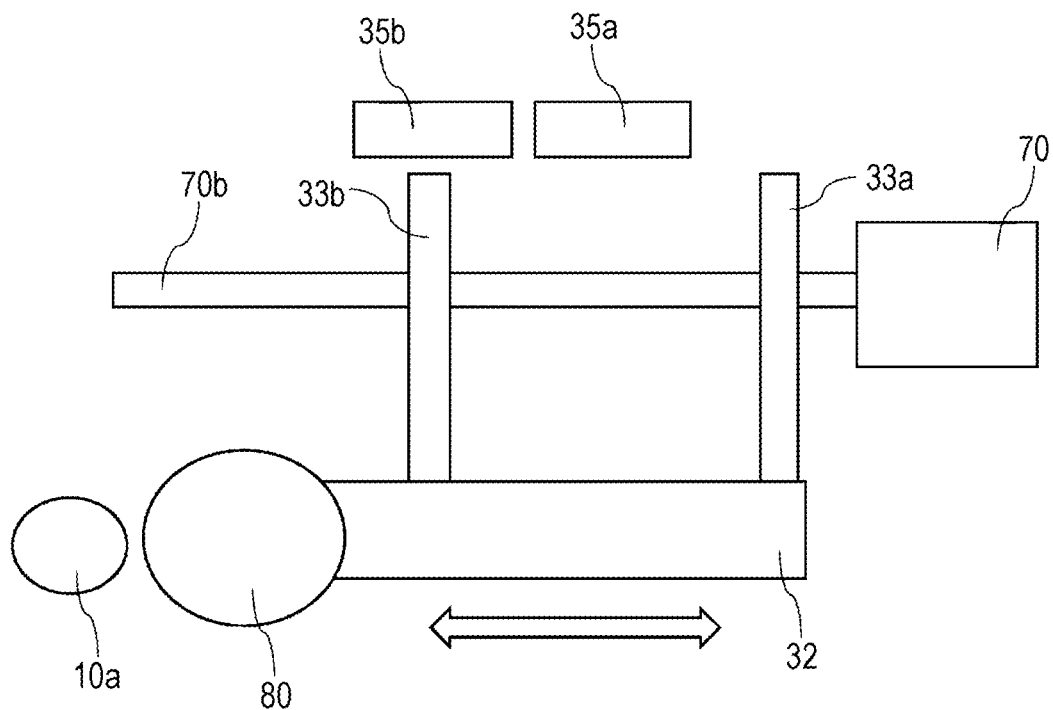
FIG. 30 is a diagram of the imaging device according to the fifth modification of the first embodiment with the blade open.

A fifth modification of the present embodiment will now be described with reference to the schematic diagrams in FIGS. 29 and 30. FIGS. 29 and 30 are schematic diagrams of a movable blade mechanism included in an imaging device according to the present modification. FIG. 29 shows the blade 80 in the closed state. FIG. 30 shows the blade 80 in the open state.

The imaging device according to the present modification differs from the structure according to the fourth modification in including position detectors 35a and 35b. Also, the sound member 34 is replaced with a sound output unit (not shown). The modification will be described focusing on its differences from the fourth modification, without the same structures being described.

The imaging device according to the present modification includes a blade 80, a motor 70, a motor output 70b, a slide gear 32, protrusions 33a and 33b, and the position detectors 35a and 35b. In the imaging device according to the present modification, the position detectors 35a and 35b can function as the position detector 121. The imaging device according to the present modification also includes the sound output unit (not shown).

As shown in FIGS. 29 and 30, when the blade 80 is in the closed state, the position detector 35a faces the protrusion 33a. When the blade 80 is in the open state, the position detector 35b faces the protrusion 33b. Each of the position detectors 35a and 35b detects the protrusion 33a or 33b at its facing position. This allows determination as to whether the blade 80 is open or closed based the output from the position detectors 35a and 35b.

In the imaging device according to the present modification, when the state of the blade 80 changes from the closed to open state, the signal processor 134 outputs a sound from the sound output unit (not shown) and provides the user with a notification indicating that the state of the blade 80 has changed to the open state. The sound output unit is an example of a notification unit in an aspect of the present invention.

The sound may be output when the state of the blade 80 changes from the open to closed state, instead of when changing from the closed to open state. To reduce unintended opening of the blade 80 for privacy protection and security, the user may receive a notification indicating the change from the open state to the closed state.

The notification may be provided to the user through, for example, an image or vibrations, rather than a sound from the sound output unit. More specifically, a light emitter, such as a light emitting diode (LED) may be used. In another example, to allow the user to directly view the blade 80, the surface of the blade 80 on the subject end may be coated with an eye-catching color that is different from the color of the housing. In other words, the notification unit may provide the notification to the user in any sensuous manner including through a sound.

2. Second Embodiment (1) Functional Structure of Imaging Device in Second Embodiment A second embodiment of the present invention will now be described specifically with reference to FIGS. 31 and 32. The movable blade mechanism in the present embodiment has the same components as the movable blade mechanism in the first embodiment, but has a different functional structure and operations from the movable blade mechanism in the first embodiment. The embodiment will be described focusing on its differences from the first embodiment, without the same structures and processing being described.

Figure 31:
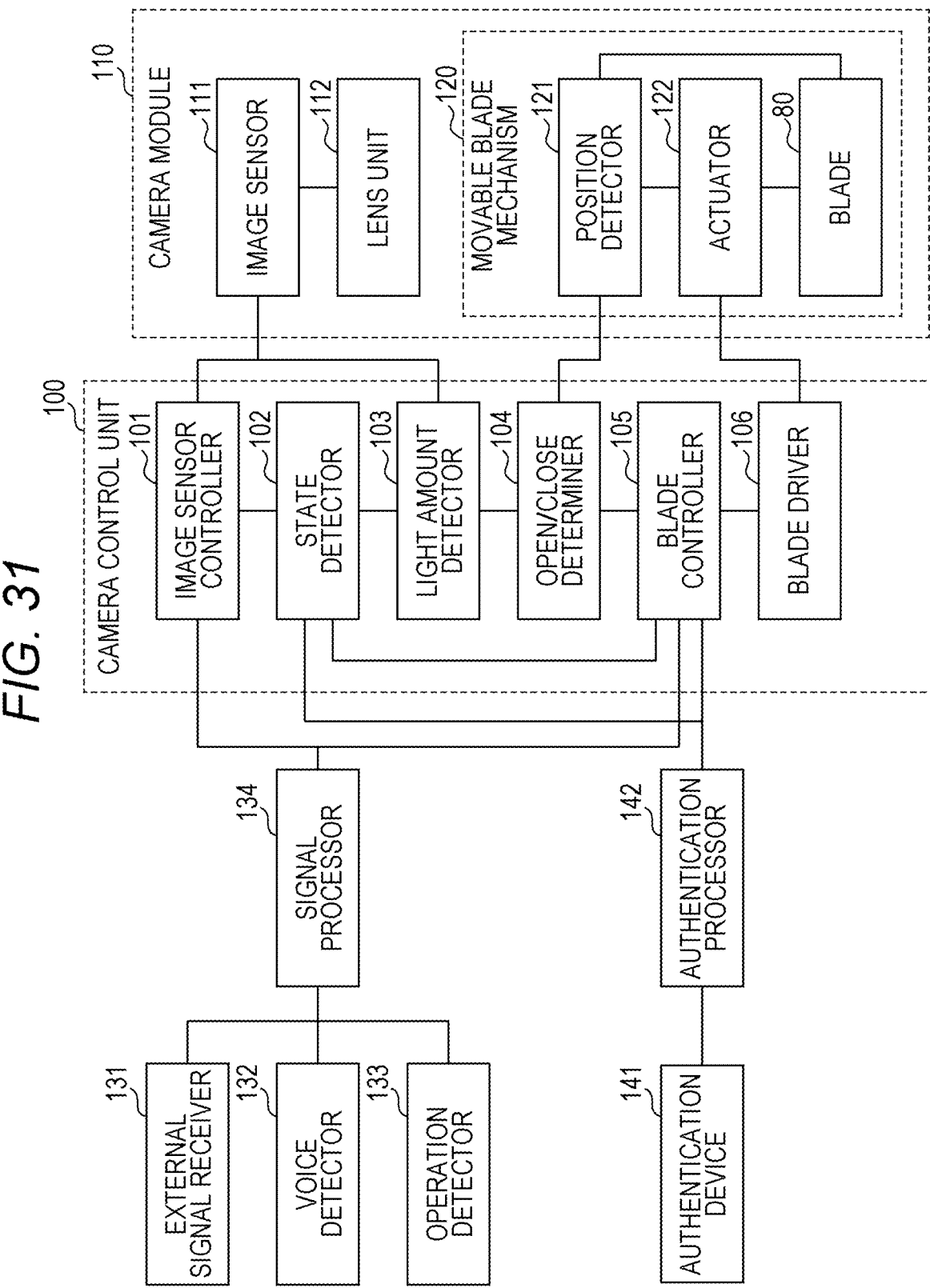
FIG. 31 is a functional block diagram of an imaging device according to a second embodiment.

FIG. 31 is a functional block diagram of an imaging device system according to the present embodiment. The structure of the present embodiment includes an authentication device 141 and an authentication processor 142 in addition to the components in the imaging device according to the first embodiment. The authentication device 141 and the authentication processor 142 dedicated to authentication of the user are connected externally to the imaging device. The authentication device 141 and the authentication processor 142 are, collectively, an example of an authentication unit in an aspect of the present invention.

Authentication Device 141

The authentication device 141 is a reader component for authenticating a registered authorized user with, for example, the user's fingerprint, face, iris, or vein. The authentication device 141 performs user authentication with a known method using, for example, an image or infrared rays.

Authentication Processor 142

The authentication processor 142 performs various processes based on the result of authentication performed by the authentication device 141. The authentication processor 142 notifies the state detector 102 and the blade controller 105 included in the imaging device of the authentication result, and causes the state detector 102 and the blade controller 105 to perform predetermined operations.

(2) Operation of Imaging Device in Second Embodiment

Figure 32:
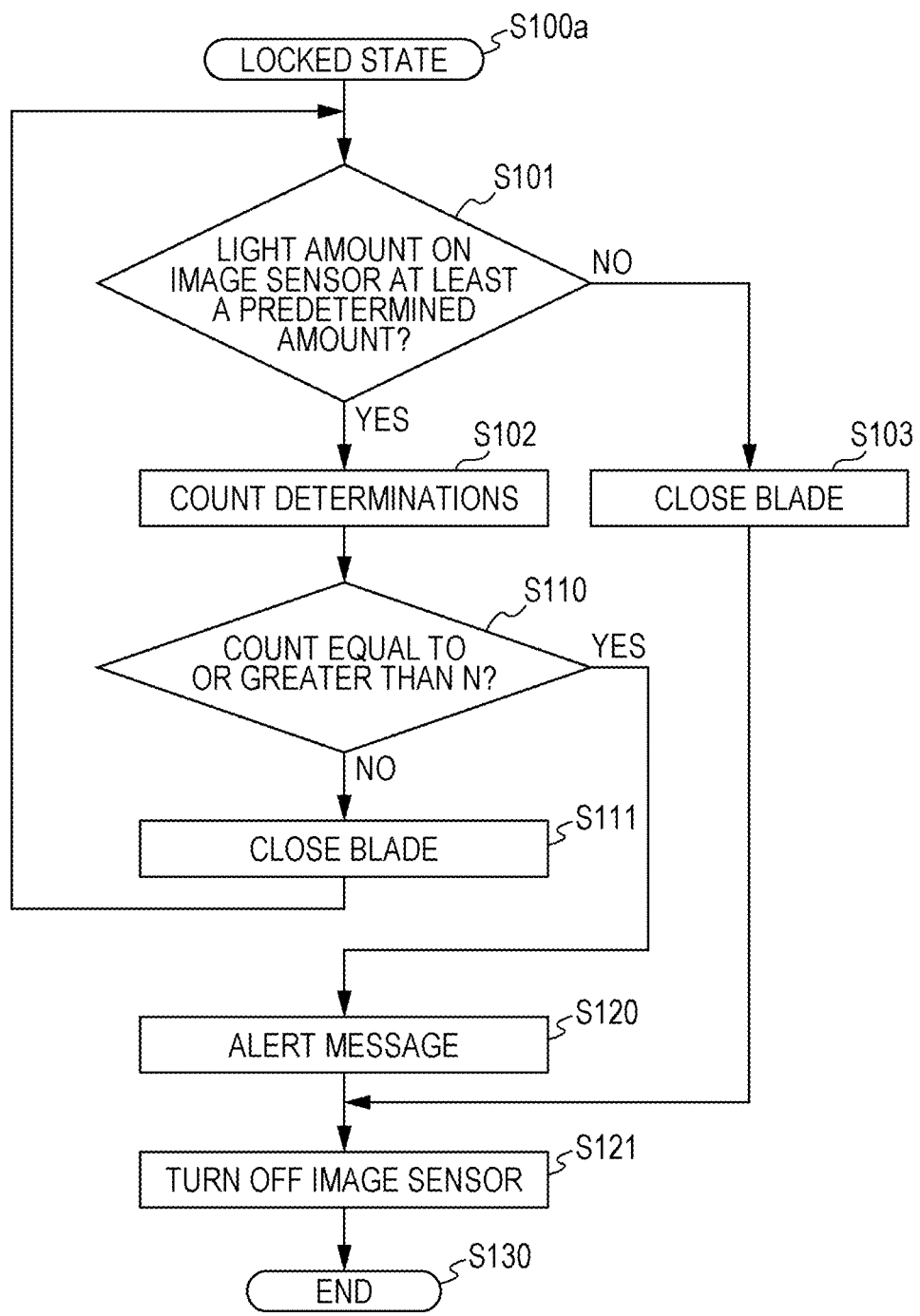
FIG. 32 is a flowchart showing the operation of the imaging device according to the second embodiment.

The opening/closing operation of the blade in the imaging device according to the present embodiment will now be described with reference to the flowchart in FIG. 32. The opening/closing operation of the blade according to the present embodiment differs from the operation in the first embodiment in the situation in which the operation is performed, with the same processing actually performed. Thus, the same processing as in the first embodiment will not be described. In the present embodiment, the state in which authentication has not been successful is referred to as a locked state. The state in which authentication has been successful is referred to as an unlocked state. The locked state is an example of the non-imaging mode in which imaging is off.

S100a

The opening/closing operation of the blade 80 according to the present embodiment is performed in the locked state in which authentication has not been successful, instead of in the non-imaging mode in the first embodiment (S100a). The processing in each step in the present embodiment is the same as the processing in each step performed in the non-imaging mode in the first embodiment.

More specifically, in the same manner as the process to close the blade 80 in the non-imaging mode, the process to close the blade 80 in the locked state is performed.

(3) First Modification

Figure 33:
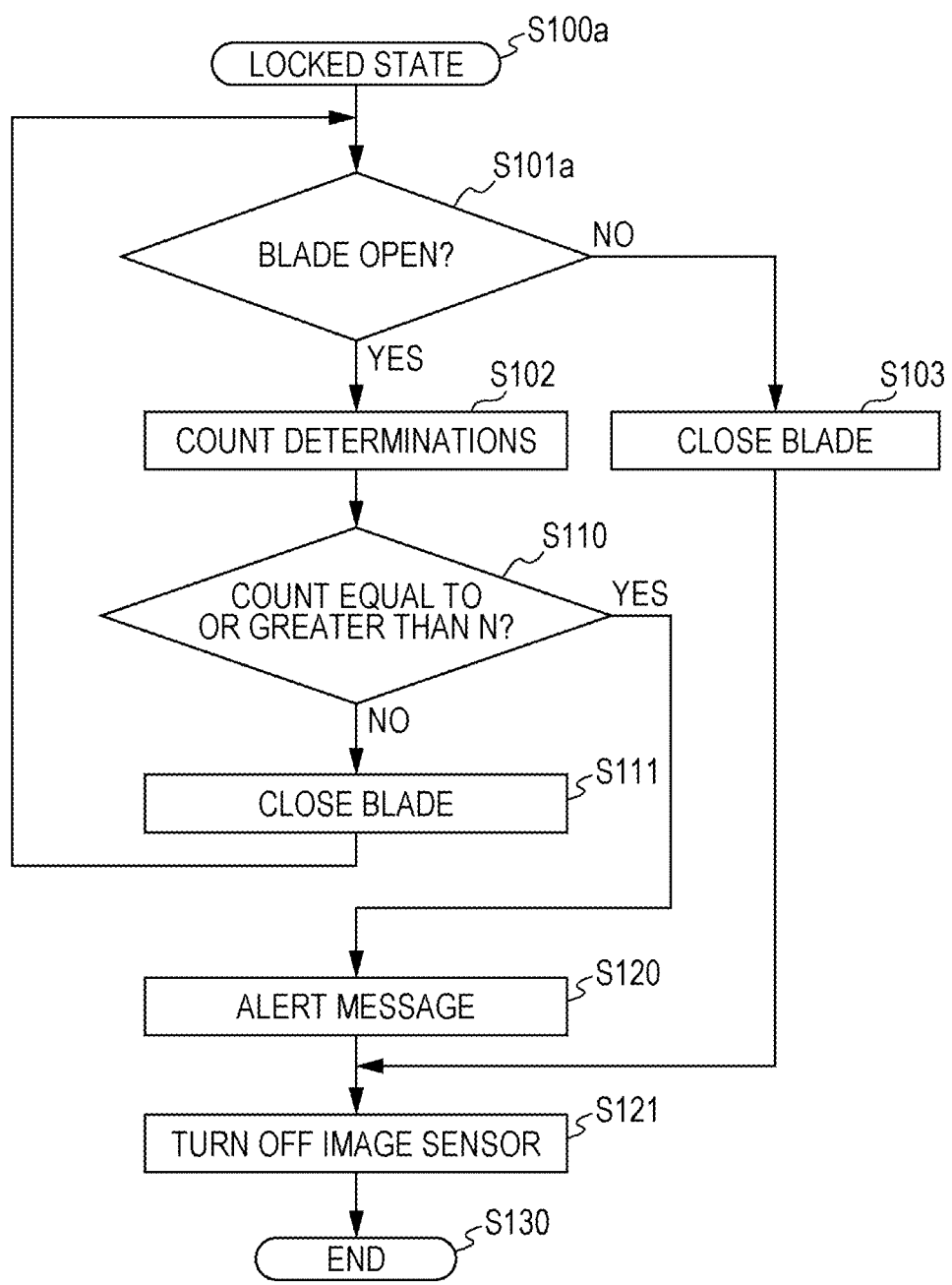
FIG. 33 is a flowchart showing the operation of an imaging device according to a first modification of the second embodiment.

A first modification of the present embodiment will now be described with reference to the flowchart in FIG. 33. The present modification differs from the first modification of the first embodiment in the situation in which the process is performed, with the same processing actually performed. Thus, the same processing as in the first modification of the first embodiment will not be described.

S100a

The opening/closing operation of the blade 80 in the present embodiment is performed in the locked state in which authentication has not been successful, instead of in the non-imaging mode in the first embodiment and its first modification (S100a). The processing in each step in the present modification is the same as the processing in each step performed in the non-imaging mode in the first modification of the first embodiment.

(4) Second Modification

Figure 34:
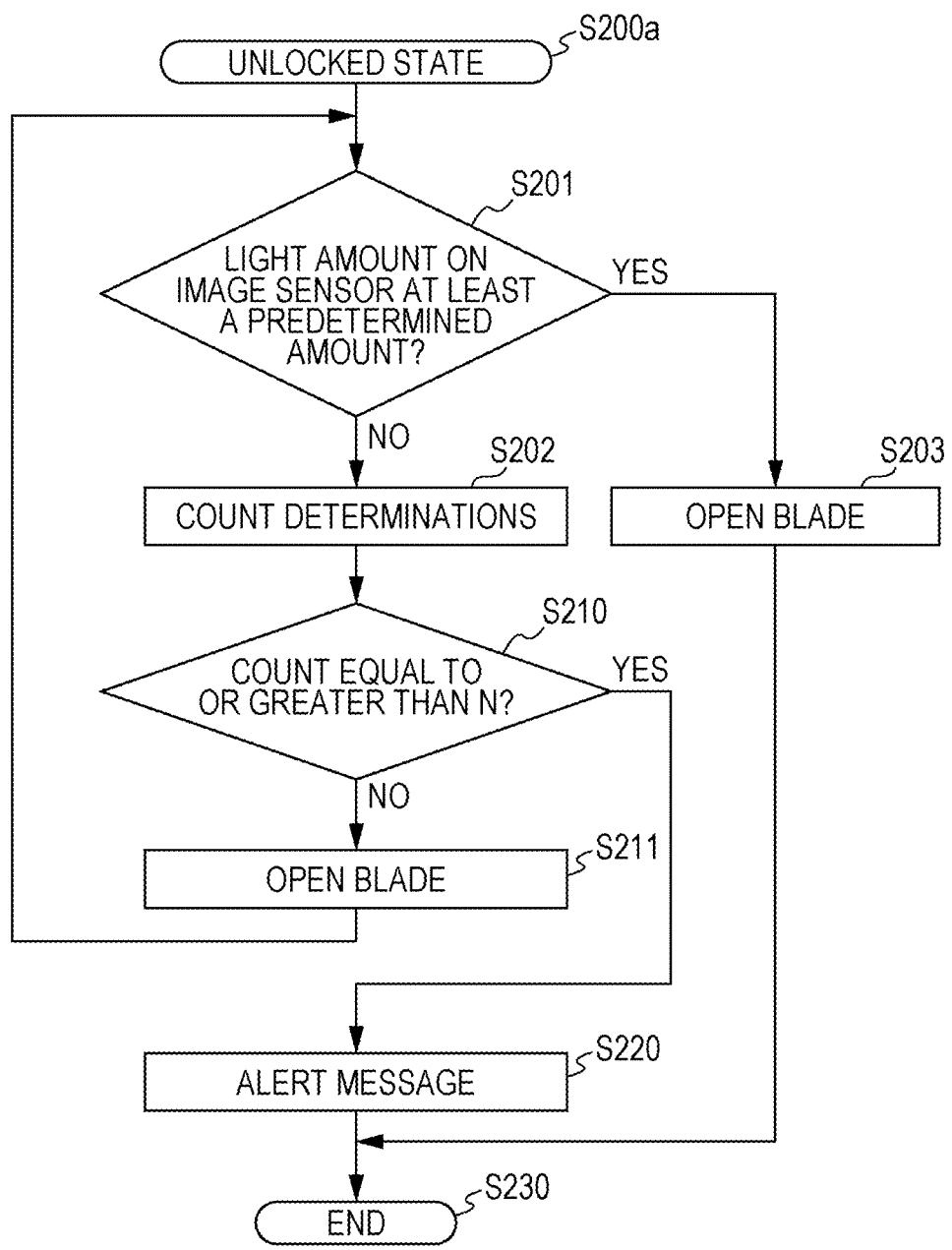
FIG. 34 is a flowchart showing the operation of an imaging device according to a second modification of the second embodiment.

A second modification of the present embodiment will now be described with reference to the flowchart in FIG. 34. The present modification differs from the second modification of the first embodiment in the situation in which the process is performed, with the same processing actually performed. Thus, the same processing as in the second modification of the first embodiment will not be described.

S200a

The opening/closing operation of the blade 80 in the present embodiment is performed in the unlocked state in which authentication has been successful, instead of in the imaging mode in the second modification of the first embodiment (S200a). More specifically, after the authentication device 141 reads, for example, a fingerprint and the authentication processor 142 authenticates the user as an authorized user, the process is performed.

(5) Third Modification

Figure 35:
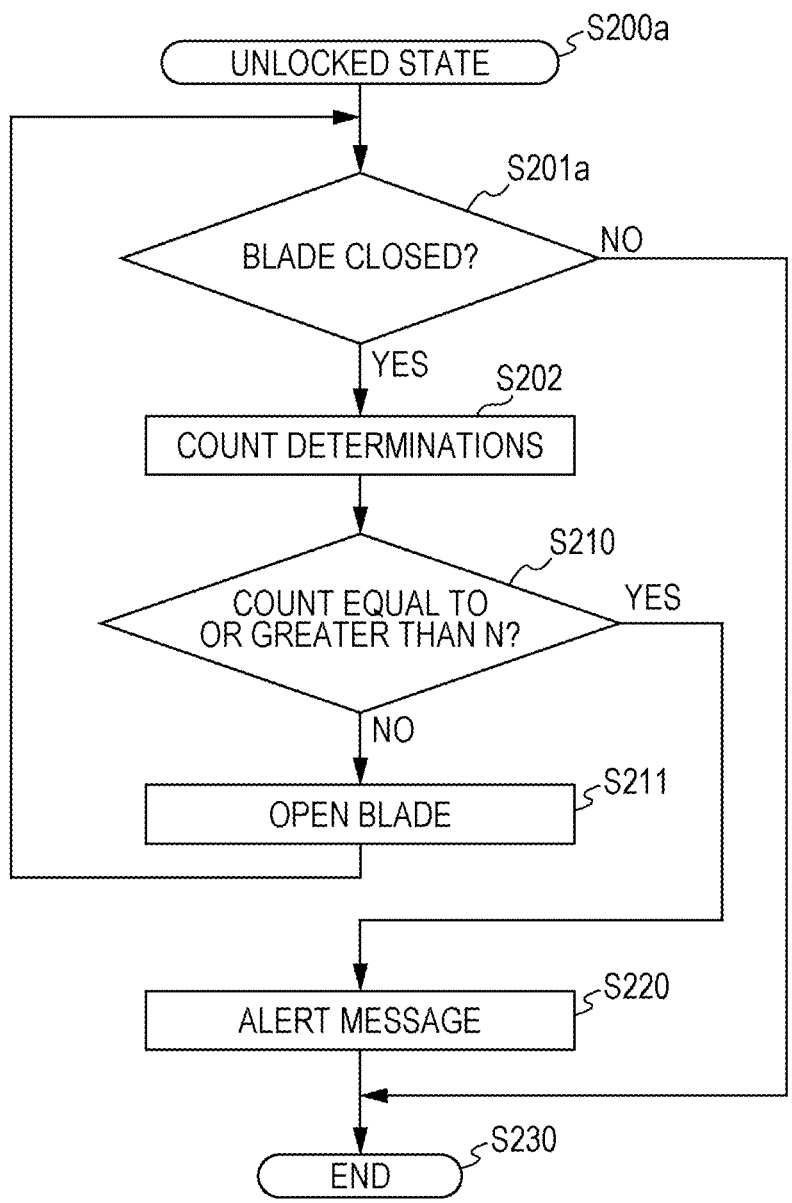
FIG. 35 is a flowchart showing the operation of an imaging device according to a third modification of the second embodiment.

A third modification of the present embodiment will now be described with reference to the flowchart in FIG. 35. The present modification differs from the third modification of the first embodiment in the situation in which the process is performed, with the same processing actually performed. Thus, the same processing as in the third modification of the first embodiment will not be described.

S200a

The opening/closing operation of the blade 80 in the present embodiment is performed in the unlocked state in which authentication has been successful, instead of in the imaging mode in the third modification of the first embodiment (S200a). More specifically, after the authentication device 141 reads, for example, a fingerprint and the authentication processor 142 authenticates the user as an authorized user, the process is performed.

3. Features

The structures according to the first and second embodiments of the present invention and their modifications described above have the features described below. The first embodiment, the second embodiment, and their modifications may be partly or entirely combined together.

In the imaging device according to an example of the present invention, the blade controller 105 determines whether the blade 80 is in the closed state in the non-imaging mode in which imaging is off. When determining that the blade 80 is in the open state, the blade controller 105 controls the blade driver 106 to close the blade 80. The structure can automatically restore the blade 80 to the closed state when the blade 80 is opened in the non-imaging mode as unintended by the user and imaging is enabled. Thus, the structure can restore the closed state when the blade 80 supposedly in the closed state is opened by, for example, a drop impact or unauthorized access. This prevents image capturing unintended by the user and also prevents invasion of privacy.

In the imaging device according to another example of the present invention, the blade controller 105 determines whether the blade 80 is in the closed state at every predetermined time in the non-imaging mode. When determining that the blade 80 is in the open state, the blade controller 105 controls the blade driver 106 to close the blade 80. The structure can restore the blade 80 in the open state to the closed state after the predetermined time elapses. This effectively prevents the blade 80 from remaining open unintentionally.

In the imaging device according to another example of the present invention, the blade controller 105 may control the blade driver 106 to retain the blade 80 in the closed state in the non-imaging mode. This structure allows the blade 80 to remain closed under an external force for opening the blade 80 applied in the non-imaging mode. This effectively prevents the blade 80 from opening as unintended by the user.

In the imaging device according to another example of the present invention, the blade controller 105 determines whether the blade 80 is in the open state in the imaging mode. When determining that the blade 80 is in the closed state, the blade controller 105 controls the blade driver 106 to open the blade 80. The structure can automatically open the blade and imaging is enabled when the blade 80 is closed in the imaging mode as unintended by the user and imaging is disabled. This restores the blade to the open state when the blade supposedly in the open state is closed by, for example, a drop impact or unauthorized access.

In the imaging device according to another example of the present invention, the blade controller 105 determines whether the blade 80 is in the closed state in the locked state in which authentication has not been performed successfully by an authentication unit for authenticating the user. When determining that the blade 80 is in the open state, the blade controller 105 controls the blade driver 106 to close the blade 80. The structure can automatically restore the blade 80 to the closed state when the blade 80 is opened as unintended by the user in the locked state and imaging is enabled. Thus, the structure can restore the closed state when the blade 80 supposedly in the closed state is opened by, for example, a drop impact or unauthorized access. This prevents image capturing unintended by the user and also prevents invasion of privacy.

In the imaging device according to another example of the present invention, the blade controller 105 may determine whether the blade 80 is in the closed state at every predetermined time in the locked state. When determining that the blade 80 is in the open state, the blade controller 105 may control the blade driver 106 to close the blade 80. This structure restores the closed state after a predetermined time elapses when the blade 80 is opened in the locked state in which authentication has not been successful. This effectively prevents the blade from remaining open unintentionally.

In the imaging device according to another example of the present invention, the blade controller 105 may control the blade driver 106 to retain the blade 80 in the closed state in the locked state. This structure allows the blade 80 to remain closed under an external force for opening the blade 80 applied in the locked state. This effectively prevents the blade 80 from remaining open as unintended by the user.

In the imaging device according to another example of the present invention, the blade controller 105 determines whether the blade 80 is in the open state in the unlocked state. When determining that the blade 80 is in the closed state, the blade controller 105 controls the blade driver 106 to open the blade 80. The structure automatically opens the blade 80 and imaging is enabled when the blade 80 is closed in the unlocked state as unintended by the user and imaging is disabled. Thus, the structure can restore the blade 80 to the open state when the blade 80 supposedly in the open state is closed by, for example, a drop impact or unauthorized access.

In the imaging device according to another example of the present invention, the blade controller 105 may determine whether the blade 80 is in the open state or in the closed state based on the detection result from the image sensor 111. This structure allows determination as to whether the blade 80 is in the open state or in the closed state without any extra member for determining the open or closed state of the blade 80. Thus, processes may be performed in accordance with the open or closed state of the blade 80 without additional components for any new structure or additional cost and complicated processing.

The imaging device according to another example of the present invention may include the position sensors 20*c* and 20*d* and the light shield 31 functioning as the position detector 121, or the position detectors 35*a* and 35*b*. The blade controller 105 may determine whether the blade 80 is in the open state or in the closed state based on the detection result from the position detector 121. This structure allows appropriate determination as to whether the blade 80 is in the open state or in the closed state in dark surroundings.

The imaging device according to another example of the present invention may further include the notification unit that provides a notification indicating one of the open state and the closed state of the blade 80. The structure allows the user to notice the state of the blade 80, and thus prevents the blade 80 from entering the open state or the closed state as unintended by the user.

In the imaging device according to another example of the present invention, the notification unit includes the sound output unit that outputs a sound when the blade enters the open state. This structure allows the user to notice the open state of the blade 80 by hearing sound in, for example, dark surroundings. The structure thus allows the user to notice the state of the blade 80 more reliably.

In the imaging device according to another example of the present invention, the notification unit may include a light emitter that changes the light emission when the blade enters the open state. This structure allows the user to notice the open state of the blade 80 visually in, for example, noisy or dark surroundings. The structure thus allows the user to notice the state of the blade 80 more reliably.

In the imaging device according to another example of the present invention, the notification unit may include a color change unit that allows visual recognition of the color change from outside when the blade 80 enters the open state. The simple structure allows the user to notice the open state of the blade 80 visually. The structure thus allows the user to notice the state of the blade 80 more reliably.

The imaging device according to another example of the present invention includes the base 10 and the spring 60. The opening 10*a* in the base 10 is located between the blade 80 and the image sensor 111 in the closed state. The structure allows the spring 60 to maintain the open or closed state of the blade 80, and thus prevents the blade to be open or closed unexpectedly under an external force.

In the imaging device according to another example of the present invention, the blade 80, which can be driven by the blade driver 106, may be manually movable with, for example, the knob 80*c*. The structure allows the blade 80 to be moved manually when the blade 80 cannot be closed after, for example, unauthorized access. This can increase security.

In the imaging device according to another example of the present invention, the blade 80 may have the protrusion (knob 80*c*) protruding toward the subject end. In this structure, the blade 80 is easily operable manually.

The imaging device according to another example of the present invention may be incorporated in an electronic device, such as a smartphone, a tablet, and a personal computer (PC). An electronic device susceptible to privacy invasion and leakage of confidential information caused by unauthorized access may incorporate the imaging device according to at least one example of the present invention to effectively increase security.

4. Supplemental Examples

Embodiments of the present invention have been described specifically. The embodiments described above are merely examples. The scope of the present invention is not limited to the embodiments, but is construed broadly within the scope understandable by those skilled in the art.

For example, the blade 80 reciprocates linearly in x-direction in the embodiments, but the blade 80 may move along an arc.

In the embodiments, the first gear 41, the second gear 42, and the slide gear 30 as power transmission members are located between the motor 70 and the blade 80. The structure may be changed in any manner. In one example, the first gear 41 and the second gear 42 may have different speed reducing ratios. In another example, the first gear 41 and the second gear 42 may be eliminated.

In the embodiments, the motor 70 drives the blade 80 through the first gear 41, the second gear 42, and the slide gear 30. Another component such as an actuator may drive the blade 80 instead of the motor 70.

The direction in which the output shaft of the motor 70 extends and the rotation direction of the power output from the motor 70 may be changed in any other directions.

The base 10 in any embodiment may be a portion of a housing (exterior) that is viewable from outside the imaging device. In this case, the blade may be exposed outside the imaging device.

The functional structures described in the embodiments are merely examples, and may be partly eliminated or may include other structures.

The flowcharts for the opening/closing operation of the blade 80 described in the embodiments and the modifications are merely operational examples. The operations are not limited to the processes described in the flowcharts.

INDUSTRIAL APPLICABILITY

The imaging device according to at least one embodiment of the present invention is used suitably for electronic devices, such as a laptop personal computer, a smart speaker, a smartphone, and a home security camera.

What is claimed is:

1. An imaging device, comprising:
   an image sensor;
   a blade operable to switch between a closed state in which the blade at least partially blocks light incident on the image sensor and an open state in which light is incident on the image sensor;
   a blade driver configured to drive the blade; and
   a blade controller configured to control the blade driver, wherein the blade controller determines whether the blade is in the closed state in a non-imaging mode in which imaging is off, and
   when determining that the blade is in the open state, the blade controller controls the blade driver to close the blade, wherein
   the blade controller determines whether the blade is in the closed state at every predetermined time in the non-imaging mode, and when determining that the blade is in the open state, the blade controller controls the blade driver to close the blade.

2. The imaging device according to claim 1, wherein the blade controller controls the blade driver to retain the blade in the closed state in the non-imaging mode.

3. The imaging device according to claim 1, wherein
the blade controller determines whether the blade is in the open state in an imaging mode in which imaging is on, and when determining that the blade is in the closed state, the blade controller controls the blade driver to open the blade.

4. The imaging device according to claim 1, wherein
the non-imaging mode includes a locked state in which authentication has not been performed successfully by an authentication unit for authenticating a user.

5. The imaging device according to claim 4, wherein
the blade controller determines whether the blade is in the open state in an unlocked state in which authentication has been successfully performed by the authentication unit, and when determining that the blade is in the closed state, the blade controller controls the blade driver to open the blade.

6. The imaging device according to claim 1, wherein
the blade controller determines whether the blade is in the open state or in the closed state based on a result of detection performed by the image sensor.

7. The imaging device according to claim 1, further comprising:
a position detector configured to detect a position of the blade,
wherein the blade controller determines whether the blade is in the open state or in the closed state based on a result of detection performed by the position detector.

8. The imaging device according to claim 1, further comprising:
a notification unit configured to provide a notification indicating one of the open state and the closed state of the blade.

9. The imaging device according to claim 8, wherein
the notification unit includes a sound output unit configured to output a sound when the blade enters the open state.

10. The imaging device according to claim 8, wherein
the notification unit includes a light emitter configured to change light emission when the blade enters the open state.

11. The imaging device according to claim 8, wherein
the notification unit includes a color change unit that allows visual recognition of a color change from outside when the blade enters the open state.

12. The imaging device according to claim 1, further comprising:
a base supporting the blade in a movable manner, the base having an opening; and
an urging member configured to urge the blade in the open state in a direction different from a direction in which the blade is urged in the closed state,
wherein the opening is located between the blade and the image sensor in the closed state.

13. The imaging device according to claim 12, wherein
the blade is movable by a manual operation in addition to being movable by the blade driver.

14. The imaging device according to claim 13, wherein
the blade includes an operation unit that is operable.

15. An electronic device, comprising:
the imaging device according to claim 1.

* * * * *